United States Patent
Yang et al.

(10) Patent No.: US 10,080,025 B2
(45) Date of Patent: Sep. 18, 2018

(54) DATA PROCESSING SYSTEM MODIFYING MOTION COMPENSATION INFORMATION, AND METHOD FOR DECODING VIDEO DATA INCLUDING THE SAME

(71) Applicant: SAMSUNG ELECTRONICS CO., LTD., Suwon-si (KR)

(72) Inventors: Jung Yeop Yang, Seoul (KR); Hyuk Jae Jang, Suwon-si (KR); Hyung Ju Chun, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 288 days.

(21) Appl. No.: 14/953,971

(22) Filed: Nov. 30, 2015

(65) Prior Publication Data
US 2016/0156937 A1 Jun. 2, 2016

(30) Foreign Application Priority Data
Nov. 28, 2014 (KR) ........................ 10-2014-0168004

(51) Int. Cl.
| | | |
|---|---|---|
| H04N 19/51 | (2014.01) | |
| H04N 19/436 | (2014.01) | |
| H04N 19/176 | (2014.01) | |
| H04N 19/119 | (2014.01) | |
| H04N 19/156 | (2014.01) | |
| H04N 19/80 | (2014.01) | |

(52) U.S. Cl.
CPC ......... *H04N 19/176* (2014.11); *H04N 19/119* (2014.11); *H04N 19/156* (2014.11); *H04N 19/436* (2014.11); *H04N 19/80* (2014.11)

(58) Field of Classification Search
CPC .... H04N 19/513; H04N 19/436; H04N 19/44; H04N 19/82; H04N 19/51
See application file for complete search history.

(56) References Cited

U.S. PATENT DOCUMENTS

| 8,223,838 | B2 | 7/2012 | Iwata et al. | |
|---|---|---|---|---|
| 8,483,279 | B2 | 7/2013 | Hiramatsu et al. | |
| 2005/0147166 | A1* | 7/2005 | Shibata | H04N 19/159 375/240.15 |
| 2006/0233525 | A1* | 10/2006 | Shibata | H04N 19/70 386/329 |
| 2010/0158125 | A1 | 6/2010 | Park et al. | |
| 2011/0176610 | A1* | 7/2011 | He | G06T 1/0028 375/240.16 |
| 2012/0008681 | A1* | 1/2012 | Lundin | H04N 19/895 375/240.12 |

(Continued)

FOREIGN PATENT DOCUMENTS

| JP | 2000-295616 A | 10/2000 |
|---|---|---|
| JP | 2010-34802 A | 2/2010 |
| KR | 10-1219220 B1 | 1/2013 |

*Primary Examiner* — Behrooz Senfi
(74) *Attorney, Agent, or Firm* — Sughrue Mion, PLLC

(57) ABSTRACT

A data processing system includes a first core configured to decode a first picture and generate decoding history information of the decoded first picture, and a second core configured to modify first motion compensation information included in a second picture based on the decoding history information of the decoded first picture and decode the second picture based on the decoded first picture and the modified first motion compensation information.

20 Claims, 28 Drawing Sheets

(56) References Cited

U.S. PATENT DOCUMENTS

| | | |
|---|---|---|
| 2012/0051440 A1* | 3/2012 | Parfenov .............. H04N 19/159 375/240.26 |
| 2012/0121017 A1* | 5/2012 | Chen .................... H04N 19/159 375/240.15 |
| 2012/0140816 A1 | 7/2012 | Franche et al. |
| 2012/0263225 A1 | 10/2012 | Lee |
| 2013/0195175 A1 | 8/2013 | MacInnis |
| 2014/0003531 A1 | 1/2014 | Coban et al. |
| 2017/0251220 A1* | 8/2017 | Chun ................... H04N 19/172 |

* cited by examiner

DATA PROCESSING SYSTEM MODIFYING MOTION COMPENSATION INFORMATION, AND METHOD FOR DECODING VIDEO DATA INCLUDING THE SAME

CROSS-REFERENCE TO RELATED APPLICATION

This application claims priority under 35 U.S.C. § 119 to Korean Patent Application 10-2014-0168004 filed on Nov. 28, 2014 in the Korean Intellectual Property Office, the disclosure of which is incorporated by reference herein in its entirety.

BACKGROUND

1. Technical Field

Exemplary embodiments relate to a semiconductor device, and more particularly, to an application processor including multiple cores for performing real-time in-loop filtering and a system including the same.

2. Description of the Related Art

A slice and a tile in a picture can reduce a dependency in entropy encoding or entropy decoding. However, when a plurality of slices or tiles in the picture are processed by a plurality of processors in parallel, a de-blocking operation of the plurality of slices or tiles may be stalled until the processing operation of macro-blocks adjacent to boundaries of the plurality slices or tiles is finished. In addition, the plurality of processors need to exchange information on the de-blocking operation of the macro-blocks adjacent to boundaries of the plurality slices or tiles.

That is, when a plurality of divided regions in a picture are processed by a plurality of processors in parallel, the de-blocking operation may be stalled or delayed due to the dependencies and distributions of the plurality of divided regions in the picture processed by the plurality of processors.

SUMMARY

According to an aspect of an exemplary embodiment, there is provided a data processing system including a first core configured to decode a first picture and generate decoding history information of the decoded first picture; and a second core configured to modify first motion compensation information included in a second picture based on the decoding history information of the decoded first picture, and decode the second picture based on the decoded first picture and the modified first motion compensation information.

The second core may be configured to generate decoding history information of the decoded second picture, and the first core may be configured to modify second motion compensation information included in a third picture based on the decoding history information of the decoded second picture, and decode the third picture based on the modified second motion compensation information and one of the decoded first picture and the decoded second picture.

The first core may include a first motion compensation information modifier configured to modify the second motion compensation information, and the second core may include a second motion compensation information modifier configured to modify the first motion compensation information.

The first core may include a first in-loop filter connected to the first motion compensation modifier, and the second core may include a second in-loop filter connected to the second motion compensation modifier.

The first in-loop filter may perform partial in-loop filtering that is a de-blocking operation only in a block related to the modified first motion compensation information based on a first control signal received from the first motion compensation information modifier, and the second in-loop filter may perform partial in-loop filtering that is a de-blocking operation only in a block related to the modified second motion compensation information based on a second control signal received from the second motion compensation information modifier.

Each of the first picture, the second picture, and the third picture may include at least one divided region.

The first picture may include a first divided region, the decoding history information of the decoded first picture may include decoding history information of the first divided region, and the second core may modify the first motion compensation information based on the decoding history information of the first divided region.

The modified first motion compensation information may include a modified reference coordinate corresponding to a reference coordinate included in the first motion compensation information.

The second picture may include a second divided region, the decoding history information of the decoded second picture may include decoding history information of the second divided region, and the first core may modify the second motion compensation information based on the decoding history information of the second divided region.

The modified second motion compensation information may include a modified reference picture index that is modified with respect to a reference picture index included in the second motion compensation information.

According to an aspect of another exemplary embodiment, there is provided a method for decoding a plurality of pictures in video data, the method including receiving a first picture having a first divided region; receiving a second picture having a second divided region; extracting first motion compensation information included in the second picture; modifying the extracted first motion compensation information; and decoding the second picture based on the first divided region and the modified first motion compensation information.

The modifying the extracted first motion compensation information may include modifying a reference coordinate of a reference picture included in the first motion compensation information based on decoding history information of the reference picture related to the extracted first motion compensation information.

The first picture may include a third divided region different from the first divided region, and the reference coordinate of the reference picture may be modified such that the reference coordinate is changed from a first coordinate that refers to the first divided region to a second coordinate that refers to the third divided region.

The method may further include decoding a block included in the second divided region based on the first picture and the modified first motion compensation information; and performing partial in-loop filtering of the decoded block.

The method may further include receiving a third picture having a third divided region; extracting second motion compensation information included in the third picture; modifying the extracted second motion compensation information; and decoding the third picture based on the modified second motion compensation information.

The modifying the extracted second motion compensation information may include modifying a reference picture index included in the second motion compensation information based on decoding history information of a reference picture referred to by the reference picture index.

The reference picture index may be modified such that the reference picture index is changed from a second index referring to the second picture to a first index referring to the first picture.

The method may further include decoding a block in the third divided region based on the second picture and the modified second motion compensation information; and performing partial in-loop filtering of the decoded block.

The extracted second motion compensation information may include a reference picture index, and modifying the extracted second motion compensation information may include modifying the reference picture index and a reference coordinate of a reference picture referred to by the reference picture index included in the extracted second motion compensation information based on decoding history information of the first divided region or the second divided region related to the reference picture index and the reference coordinate of the reference picture.

The first picture may include a fourth divided region different from the first divided region, and modifying the extracted first motion compensation information may include modifying the reference picture index such that the reference picture index is changed from a second index referring to the second picture to a first index referring to the first picture; and modifying the reference coordinate of the reference picture such that the reference coordinate is changed from a first coordinate referring to the fourth divided region to a second coordinate referring to the first divided region.

The method may further include decoding a block in the third divided region based on the first picture and the modified second motion compensation information; and performing partial in-loop filtering of the decoded block.

The extracted first motion compensation information may be modified based on a number of reference pictures included in the extracted first motion compensation information.

The extracted first motion compensation information may be modified based on a value of a motion vector included in the extracted first motion compensation information.

The extracted first motion compensation information may be modified based on difference in pixel values on a boundary between adjacent decoded blocks before a de-blocking operation.

According to an aspect of another exemplary embodiment, there is provided a data processing system including a first decoder configured to decode a first picture and generate first motion compensation information included in the first picture, and generate first decoding history information based on a decoding result of the decoded first picture; and a second decoder configured to decode a second picture and generate second motion compensation information included in the second picture, and generate second decoding history information based on a decoding result of the decoded second picture; a decoding history storage device connected to the first decoder and the second decoder and configured to store the first decoding history information and the second decoding history information; and a motion compensation information modifier connected to the decoding history storage device and configured to modify the first and second motion compensation information based on the first and second decoding histories and the first and second motion compensation information, wherein the second decoder is configured to decode the second picture based on the modified second motion compensation information.

The first decoder may decode a third picture and generates third motion compensation information included in the third picture, and updates the first decoding history information based on the decoding result of the third picture, and the motion compensation information modifier may modify the third motion compensation information based on the third motion compensation information and the first decoding history information.

Each of the first picture, the second picture, and the third picture may have at least one divided region.

The motion compensation information modifier may generate the modified second motion compensation information by modifying a reference coordinate of a reference picture included the second motion compensation information.

The motion compensation information modifier may generate the modified third motion compensation information by modifying a reference picture index included in the third motion compensation information.

The motion compensation information modifier may generate the modified third motion compensation information by modifying a reference picture index and a reference coordinate of a reference picture referred to by the reference picture index included in the third motion compensation information.

BRIEF DESCRIPTION OF THE DRAWINGS

The above and other aspects will become more apparent by describing in detail exemplary embodiments with reference to the accompanying drawings in which.

DETAILED DESCRIPTION OF EXEMPLARY EMBODIMENTS

Figure 1:
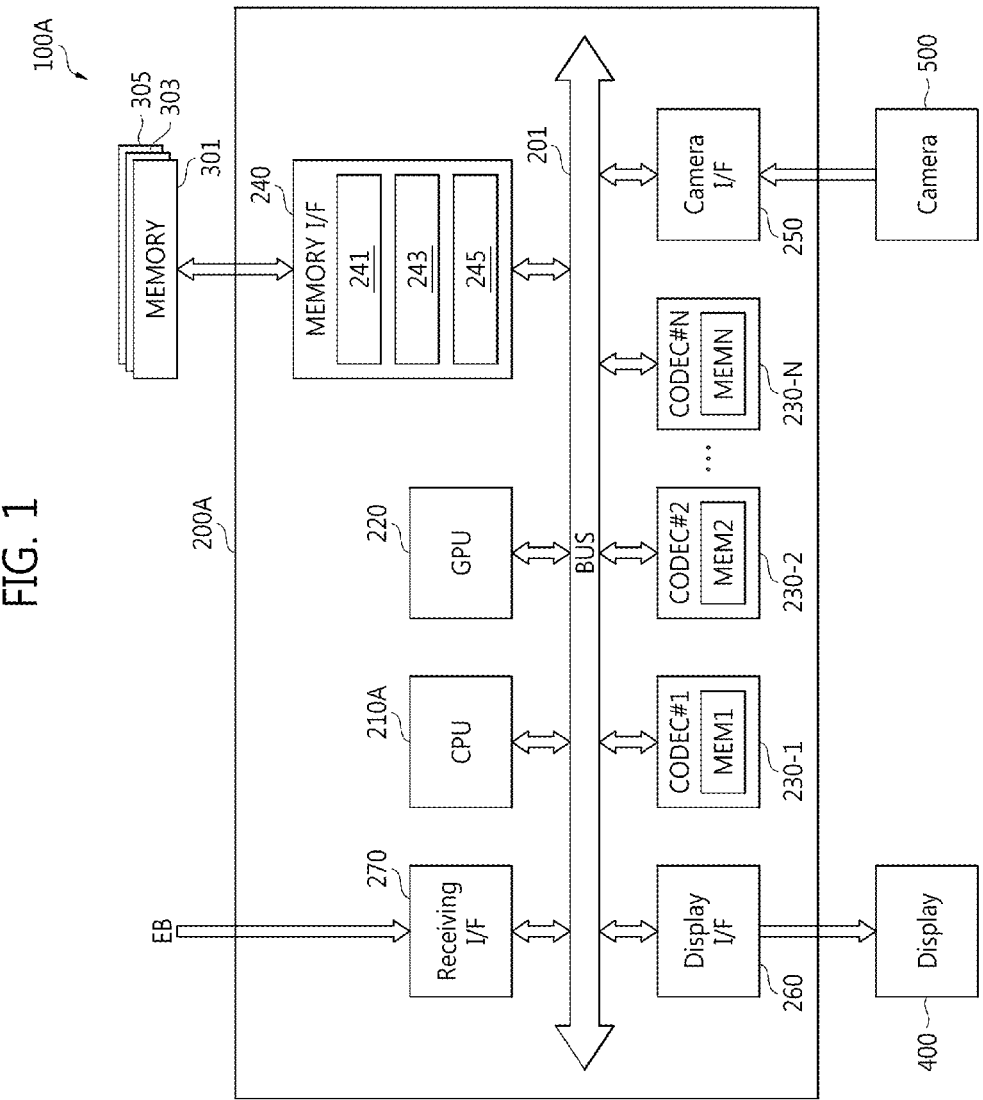
FIG. 1 is a block diagram of a data processing system according to an exemplary embodiment.

Various exemplary embodiments will now be described more fully hereinafter with reference to the accompanying drawings, in which exemplary embodiments are shown. The present inventive concept may, however, be embodied in different forms and should not be construed as limited to the exemplary embodiments set forth herein. Rather, these exemplary embodiments are provided so that this disclosure will be thorough and complete, and will fully convey the scope of the present inventive concept to those skilled in the art. The same reference numbers may indicate the same components throughout the specification. In the attached figures, the thickness of layers and regions may be exaggerated for clarity.

It will also be understood that when a layer is referred to as being "on" another layer or substrate, it can be directly on the other layer or substrate, or intervening layers may also be present. In contrast, when an element is referred to as being "directly on" another element, there are no intervening elements present.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The use of the terms "a" and "an" and "the" and similar referents in the context of describing the exemplary embodiments, especially in the context of the following claims, are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted.

Unless defined otherwise, all technical and scientific terms used herein have the same meaning as commonly understood by one of ordinary skill in the art to which this present inventive concept belongs. It is noted that the use of any and all examples, or exemplary terms provided herein is intended merely to better illuminate the present inventive concept and is not a limitation on the scope of the present inventive concept unless otherwise specified. Further, unless defined otherwise, all terms defined in generally used dictionaries may not be overly interpreted.

The exemplary embodiments will be described with reference to perspective views, cross-sectional views, and/or plan views. Thus, the profile of an exemplary view may be modified according to manufacturing techniques and/or allowances. That is, the exemplary embodiments are not intended to limit the scope of the present inventive concept but cover all changes and modifications that can be caused due to a change in manufacturing process. Thus, regions shown in the drawings are illustrated in schematic form and the shapes of the regions are presented simply by way of illustration and not as a limitation.

Various exemplary embodiments of the present inventive concept will be described more fully hereinafter with reference to the accompanying drawings.

A picture or a processing unit (i.e., a unit to be processed) in various exemplary embodiments may include one or more divided regions, for example, slices or tiles. According to exemplary embodiments, a picture may be processed by a core. In other words, all divided regions, for example, all slices or all tiles, in a picture may be processed by a single core. Here, process may mean encode, decode, encode including in-loop filtering or decode including in-loop filtering.

In various exemplary embodiments, a picture can be divided into slices. The slice defines a sequence of an integer number of macroblocks (MBs) or Coding Tree Units (CTUs) for AVC or HEVC, respectively. In exemplary embodiments for HEVC, a picture can also be divided into tiles. The tile defines a rectangular region of an integer number of CTUs and may include CTUs contained in more than one slice.

In some exemplary embodiments, the data processing system 100A, 100B, or 100C may be embodied in a full High Definition (FHD) TV or Ultra High Definition (UHD) TV. In addition, the data processing system 100A, 100B, or 100C may be compatible with a video coding standard such as H.264, High Efficiency Video Coding (HEVC), and so on.

In some exemplary embodiments, the data processing system 100A, 100B or 100C may be implemented on a personal computer (PC), a smart phone, a tablet PC, a mobile internet device (MID), a laptop computer, a mobile digital media player (M-DMP), or a portable media player (PMP).

FIG. 1 is a block diagram of a data processing system according to an exemplary embodiment. Referring to FIG. 1, a data processing system 100A may include a controller 200A, a plurality of memories 301, 303 and 305, and a display 400. In some exemplary embodiments, the data processing system 100A may further include a camera 500.

The controller 200A may be implemented as an Integrated Circuit (IC), a system on chip (SoC), a mother board, an Application Processor (AP) or a mobile AP.

The controller 200A may receive and encode input uncompressed YUV/RGB data or decode an encoded bit stream, control operations such as read/write operations of the plurality of memories 301, 303 and 305, and transmit display data or video data to the display 400. In addition, the controller 200A may process image data or video data output from the camera 500, and may store the processed image data or the processed video data in at least one of the plurality of memories 301, 303 and 305 and/or transmit the processed image data or the processed video data to the display 400.

The controller 200A may include a central processing unit (CPU) 210A, a graphic processing unit (GPU) 220, a plurality of hardware codecs 230-1 to 230-N, N being a natural number equal to or greater than 2, a memory interface (I/F) 240, a display interface (I/F) 260 and a receiver interface (I/F) 270. When the data processing system 100A further includes a camera 500, the controller 200A may further include a camera interface (I/F) 250.

The CPU 210A, the GPU 220, the plurality of hardware codecs 230-1 to 230-N, the memory interface 240, the display interface 260, and the receiver interface 270 may transmit or receive data from/to each other through a bus 201. The camera interface 250 may be connected to and transmit/receive data from/to the other components, e.g., 210A and/or 220.

The CPU 210A may include one or more cores. The CPU 210A may control an overall operation of the controller 200A. For example, the CPU 210A may execute program codes or applications for controlling operations of the GPU 220, the plurality of hardware codecs 230-1 to 230-N, the memory interface 240, the camera interface 250, the display interface 260, and/or the receiver interface 270.

The GPU 220 may be process 2D or 3D graphic data. The graphic data processed by the GPU 220 may be stored in at least one of the plurality of memories 301, 303 and 305 or may be displayed by the display 400.

The plurality of hardware codecs 230-1 to 230-N may be substantially the same in view of structure and operation. In some exemplary embodiments, each of the plurality of hardware codecs 230-1 to 230-N may be called as a core. Each of the plurality of hardware codecs 230-1 to 230-N may include one of memories MEM1 to MEMN respectively. Each of the memories MEM1 to MEMN may store information of one or more encoded and/or decoded pictures and/or perform in-loop filtering of the one or more encoded and/or decoded pictures.

The memory interface 240 may include a first memory interface 241, a second memory interface 243 and a third memory interface 245. For example, when the first memory 301 of the plurality of memories 301, 303, 305 is a dynamic random access memory (DRAM), the first memory interface 241 may be a DRAM interface. When the second memory 303 is a NAND flash memory, the second memory interface 243 may be a NAND flash interface. When the third memory 305 is an embedded multimedia card (eMMC), the third memory interface may be eMMC interface. For convenience of description in FIG. 1, three memory interfaces 241, 243 and 245 and three memories 301, 303 and 305 are illustrated; however, this is only an example, and the number of memories is not particularly limited. Therefore, a technical concept is not limited by the number of memory interfaces and memories connected to the memory interfaces.

The display interface 260 may transmit display data, for example, video data, to the display 400 under a control of CPU 210A, GPU 220, or each of the plurality of hardware codecs 230-1 to 230-N. In some exemplary embodiments, the display interface 260 may be embodied as a display serial interface (DSI) of a mobile industry processor interface MIPI®, an embedded display port (eDP) interface, or a high-definition multimedia interface (HDMI), etc. However, these interfaces are only exemplary, and the display interface 260 is not limited thereto.

The receiver interface 270 may receive an uncompressed picture data (RGB/YUV) or/and an encoded bit stream through a wired communication network or a wireless communication network. In some exemplary embodiments, the receiver interface 270 may be embodied as a universal serial bus interface (USB), an Ethernet interface, a Bluetooth interface, a Wi-Fi interface, or a long term evolution (LTE™) interface, etc. However, these interfaces are only exemplary, and the receiver interface 270 is not limited thereto.

The camera interface 250 may receive image data output from the camera 500. In some exemplary embodiments, the camera interface 250 may be a camera serial interface (CSI) of a MIPI®. However, this interface is only exemplary, and the camera interface 250 is not limited thereto. The camera 500 may a camera module including a CMOS image sensor.

Figure 2:
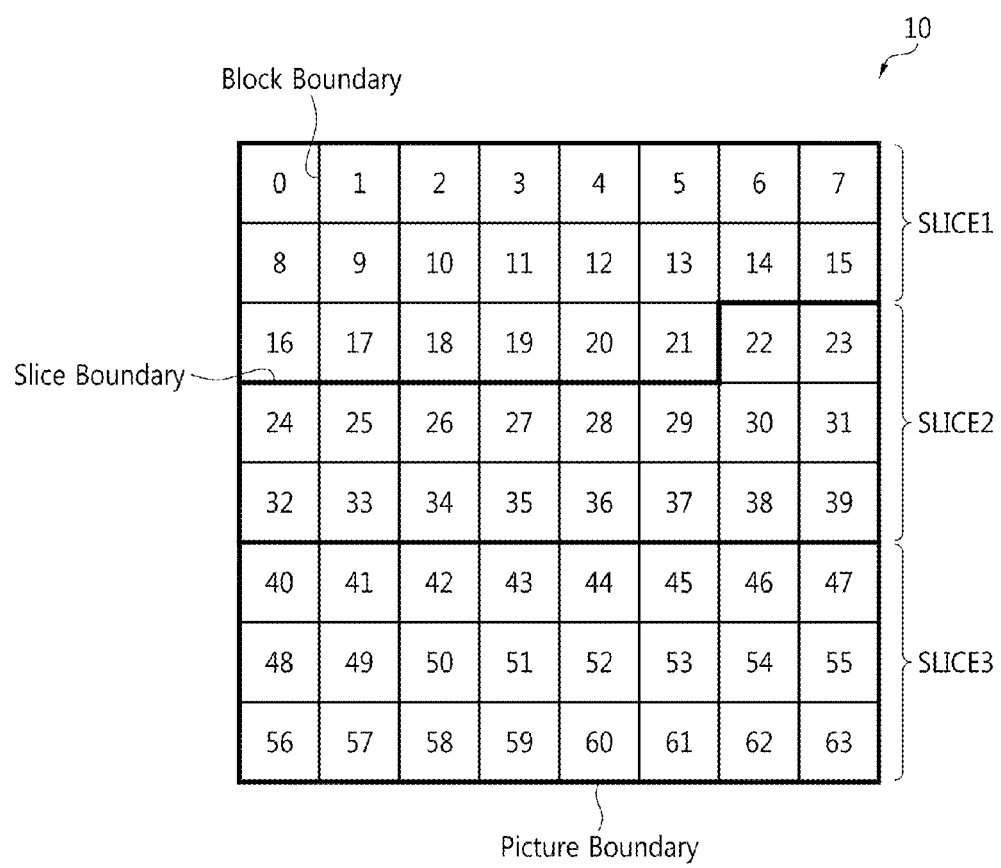
FIG. 2 is a conceptual diagram illustrating a picture including a plurality of slices.

FIG. 2 is a conceptual diagram illustrating a picture including a plurality of slices.

Referring to FIG. 2, a picture 10 may include a plurality of slices SLICE1 to SLICE3 and each of the plurality of slices SLICE1 to SLICE3 may include a plurality of blocks. For example, as shown in the example of FIG. 2, SLICE1 may include blocks 0-21, SLICE2 may include blocks 22-39, and SLICE3 may include blocks 40-63. A number of blocks included in each of the plurality of slices SLICE1 to SLICE3 may be different from each other. Alternatively, the number of blocks included in each of the plurality of slices SLICE1 to SLICE3 may be the same for each slice. The picture 10 may be a frame to encode, an original picture, a raw bitstream of a picture to encode, or a frame to decode, an encoded picture, or an encoded bitstream EB, etc. FIG. 2 shows a picture having 64 blocks, i.e., blocks 0-63. However, this is only an example, and the number of blocks may be more or less than 64.

In the H.264 video coding standard, the block may be a macro-block. In a high efficiency video coding (HEVC) standard, the block may be a coding tree unit (CTU). In some exemplary embodiments, the picture 10 may be a frame to encode, an original picture, a raw bitstream of a picture to encode, or a frame to decode, an encoded picture, or an encoded bitstream EB, etc.

An encoder may encode the blocks in a picture and a decoder may decode the blocks in a picture from a block 0 to a block 63 sequentially.

After a first block 0 in the first slice SLICE1 is processed, the encoder or decoder does not perform in-loop filtering of the processed first block 0 edge because there is no block before the processed first block 0. On the other hand, after processing a second block 1 in the first slice SLICE1, the encoder or decoder may perform in-loop filtering of the first block 0 edge and the second block 1 based on a first video data of the processed first block 0 and a second video data of the processed second block 1. That is, the encoder or decoder may perform in-loop filtering on a block boundary. Here, block boundary denotes a boundary between two blocks.

After a 23rd encoded block 22 in the second slice SLICE2 is processed, the encoder or the decoder may perform in-loop filtering of the 23rd processed block 22 edge in the second SLICE2 and prior blocks 14 and 21 in the first slice SLICE1 based on video data of the blocks 14, 21 and 23. That is, the encoder or decoder may perform in-loop filtering on a slice boundary.

After a 41st block 40 in the third slice SLICE3 is processed, the encoder or decoder may perform in-loop filtering of the 41st processed block 40 edge in the third SLICE3 and prior blocks 32 in the second slice SLICE2 based on video data of the 33rd blocks 32. That is, the encoder or decoder may perform in-loop filtering on a slice boundary. In other words, in-loop filtering of a current processed block may be performed using at least one of an upper processed block and a left processed block adjacent to the current block.

According to exemplary embodiments, a decoder including an in-loop filter that conforms to a video coding standard of H.264 may perform in-loop filtering for each block. According to exemplary embodiments of the present inventive concept, a decoder including an in-loop filter that conforms to a video coding standard of HEVC may perform in-loop filtering for each block. For example, a decoder may perform in-loop filtering of a plurality of blocks adjacent to a current decoded block on a block boundary or perform in-loop filtering of all pixels in the current decoded block according to a video coding standard of sample adaptive offset (SAO).

The in-loop filtering according to the video coding standard of H.264 may be performed based on a motion vector, prediction mode information, and/or a quantization parameter, etc. The in-loop filtering according to the video coding standard of HEVC may be performed based on a motion vector, prediction mode information, a quantization parameter, and/or a plurality of parameters of SAO filter, etc. The prediction mode may include intra-prediction mode information or inter-prediction mode information.

Figure 3:
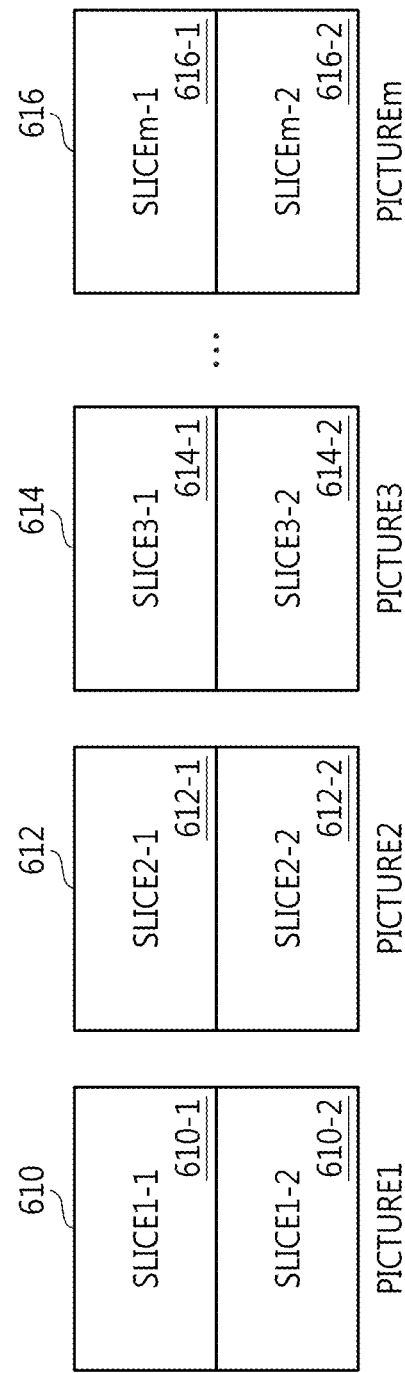
FIG. 3 a conceptual diagram illustrating a sequence of pictures including two slices respectively.
Figure 4:
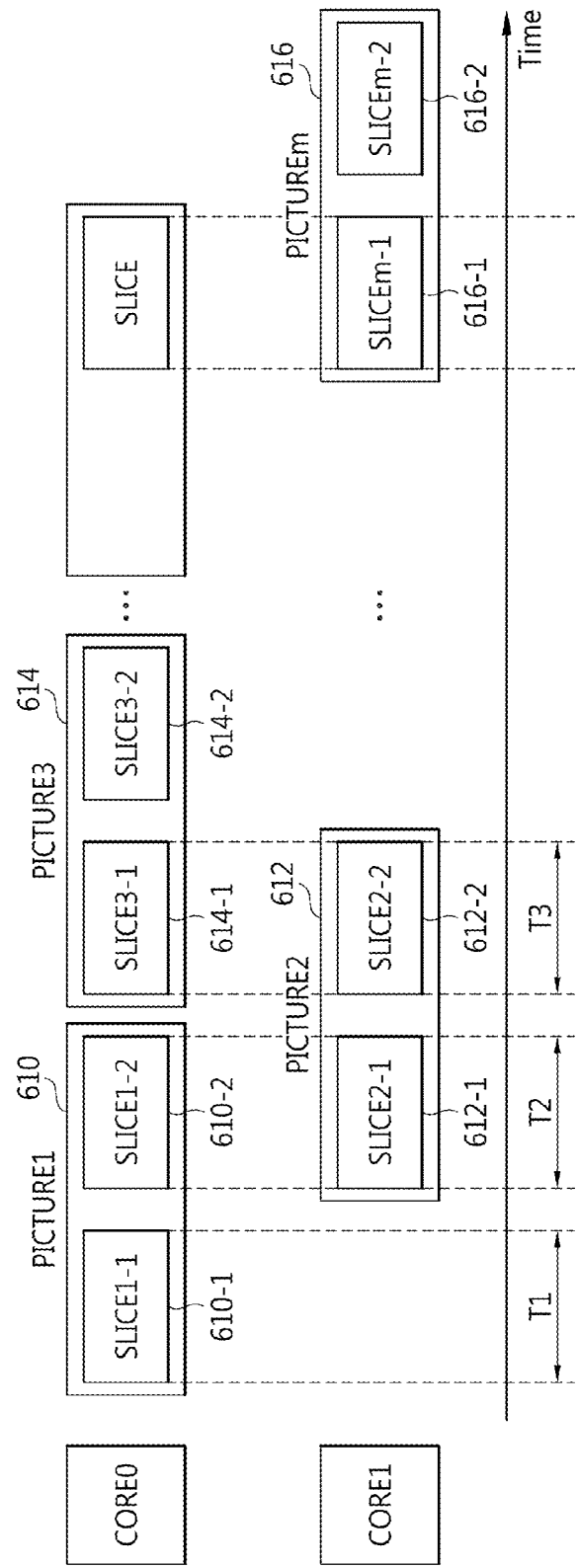
FIG. 4 is a conceptual diagram illustrating a procedure to process the sequence of pictures shown in FIG. 3 by two cores.

FIG. 3 a conceptual diagram illustrating a sequence of pictures including two slices respectively. FIG. 4 is a conceptual diagram illustrating a procedure to process the sequence of pictures shown in FIG. 3 by two cores.

Referring to FIGS. 1, 3 and 4, the controller 200A may include two hardware codecs 230-1 and 230-2. A first core CORE0 may be a first hardware codec 230-1 and a second core CORE1 may be a second hardware codec 230-2. The encoder or decoder described with reference to FIG. 2 may be included in the first core CORE0 and the second core CORE1.

Referring to FIG. 3, each of the plurality of pictures 610, 612, 614, . . . , and 616 may include two slices 610-1~610-2, 612-1~612-2, 614-1~614-2, . . . , and 616-1~616-2 respectively. Each of the plurality of pictures 610, 612, 614, . . . , and 616 may include a first processing unit 610-1, 612-1, 614-1, . . . , and 616-1, respectively, and a second processing unit 610-2, 612-2, 614-2, . . . , and 616-2, respectively. As used in the present disclosure, "processing unit" denotes a unit of data to be processed. For example, each of the plurality of pictures 610, 612, 614, . . . , and 616 may mean a frame to encode, an original picture, a raw bitstream of a picture to encode, or a frame to decode, an encoded picture, or an encoded bitstream EB received from the receiver interface 270, etc.

In some exemplary embodiments, the CPU 210A may control the receiver interface 270 such that odd picture may be assigned to the first core CORE0 and an even picture may be assigned to the second core CORE1.

In some exemplary embodiments, the CPU 210A may control the first core CORE0 and the second core CORE1 such that odd pictures may be assigned to the first core CORE0 and even pictures may be assigned to the second core CORE1.

Referring to FIG. 4, in a first time period T1, the first core CORE0 may process the first slice 610-1 of the first picture 610. The first slice 612-1 of the second picture 612 may be processed by the second core CORE1 in a second time period T2 after processing the first slice 610-1 of the first picture 610 in the first time period T1 has been completed by the first core CORE0.

In the second time period T2, the first core CORE0 may process the second slice 610-2 of the first picture 610 and the second core CORE1 may process the first slice 612-1 of the second picture 612. The processing of the first slice 612-1 and the second slice 610-2 may be performed in parallel in the second time period T2. As used in this specification, "processing . . . performed in parallel" denotes that there is some overlap in the processing. Thus, here, "parallel" denotes that there is some overlap in the processing of the first slice 612-1 and the second slice 610-2. That is, while dotted lines are used in FIGS. 4, 6, 8, 11, 14, these lines are only provided for ease of description and are not intended to suggest that the start times or the end times for processing exactly coincide. For example, the dotted lines in FIG. 4 are not intended to suggest that the start times or the end times for processing the first slice 612-1 and the second slice 610-2 exactly coincide. However, in some exemplary embodiments, the start times may exactly coincide and/or the end times may exactly coincide.

In addition, in the second time period T2, the first core CORE0 may perform in-loop filtering on a boundary of the first slice 610-1 and the second slice 610-2 of the first picture 610 for each block based on a processing result of the first slice 610-1 in the first picture 610. As described with reference to FIG. 2, the first core CORE0 may perform in-loop filtering of a current processed block using at least one of an upper processed block and a left processed block adjacent to the current block. That is, the first core CORE0 may perform the processing of the second slice 610-2 and the in-loop filtering of the first slice 610-1 and the second slice 610-2 in the second time period T2 so that no additional time is used for the in-loop filtering.

In a third time period T3, the first core CORE0 may process the first slice 614-1 of the third picture 614 and the second core CORE1 may process the second slice 612-2 of the second picture 612. The processing of the first slice 614-1 of the third picture 614 and the second slice 612-2 of the second picture 612 may be performed in parallel in the second time period T3.

In addition, in the third time period T3, the second core CORE1 may perform in-loop filtering on a boundary of the first slice 612-1 and the second slice 612-2 for each block based on a processing result of the first slice 612-1 in the second picture 612. That is, the second core CORE1 may perform the processing of the second slice 612-2 and the in-loop filtering of edge of the first slice 612-1 and the second slice 612-2 of the second picture 612 in the third time period T3 so that no additional time is used for the in-loop filtering. The second core CORE1 thus may have a 1 slice delay as shown in FIG. 4. That is, the second core CORE1 may start processing the first slice 612-1 of the second picture 612 after the first core CORE0 has finished processing the first slice 610-1 of the first picture 610.

Figure 5:
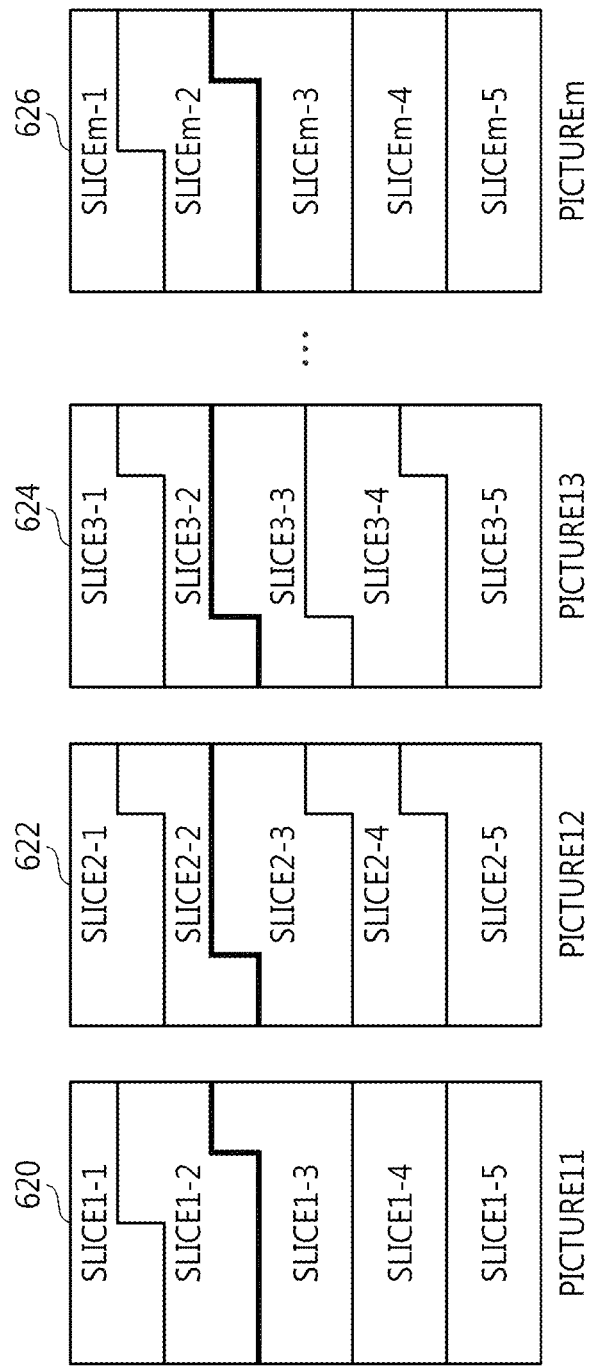
FIG. 5 is a conceptual diagram illustrating a sequence of pictures including two slice groups respectively.
Figure 6:
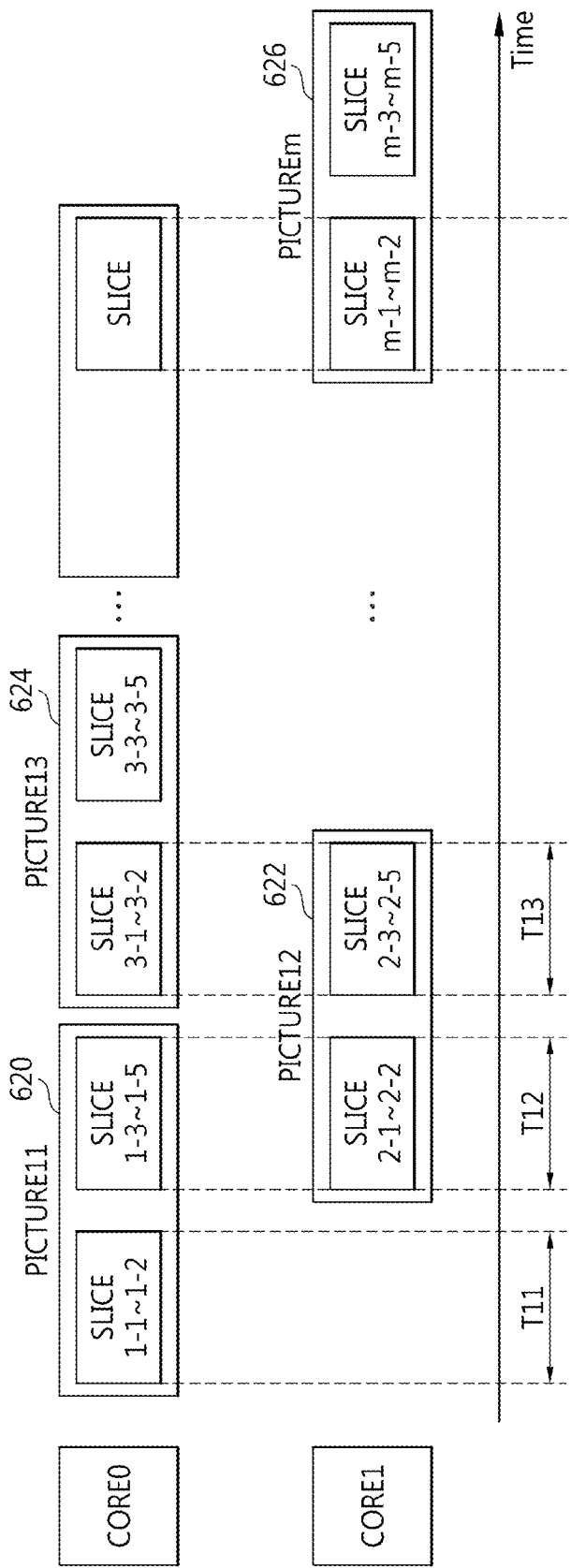
FIG. 6 is a conceptual diagram illustrating a procedure to process the sequence of pictures shown in FIG. 5 by two cores.

FIG. 5 is a conceptual diagram illustrating a sequence of pictures including two slice groups respectively. FIG. 6 is a conceptual diagram illustrating a procedure to process the sequence of pictures shown in FIG. 5 by two cores.

The controller 200A shown in FIG. 1 may include two hardware codecs 230-1 and 230-2 that may correspond to a first core CORE0 and a second CORE1 respectively. The sequence of pictures may include, for example, pictures 620, 622, 624, and 626.

The first core CORE0 may divide the picture 620 into a first processing unit and a second processing unit based on processing complexity or size of a plurality of divided regions in the picture 620. In FIGS. 5 and 6, the first processing unit may include two slices SLICE1-1 and SLICE1-2, and the second processing unit may include three slices SLICE1-3 to SLICE1-5. The first processing unit is shown above the bold line in FIG. 5, and the second processing unit is shown below the bold line in FIG. 5. FIG. 5 shows that each of the first processing units includes two slices, e.g., the first picture 620 includes a first processing unit with SLICE1-1 and SLICE1-2. However, this is only an example, and the first processing unit may have a number of slices that is fewer or greater than two slices, depending on the complexity or size of the plurality of divided regions.

The second core CORE1 may divide the picture 622 into a first processing unit and a second processing unit based on processing complexity of the picture 622. In FIGS. 5 and 6, the first processing unit may include two slices SLICE2-1 and SLICE2-2, and the second processing unit may include three slices SLICE2-3 to SLICE2-5.

For example, when the pictures 620, 622, 624 and 626 are not divided into a plurality of slices or tiles, or when a plurality of divided regions (e.g., slices or tiles) have different processing complexities, it is advantageous to define a plurality of divided regions for parallel processing of the plurality of cores CORE0 and CORE1 based on the processing complexities. Here, the first core CORE0 and the second core CORE1 may divide and process in parallel the plurality of divided regions of the pictures 620, 622, 624 and 626. The processing complexity may be defined by a decoding time and/or encoding time and/or size of slices in terms of blocks of a picture, etc.

When m is a natural number which is equal to or greater than 4 in FIG. 5, similarly, the first core CORE0 may divide the picture 624 into a first processing unit and a second processing unit based on processing complexity of the picture 624. In FIGS. 5 and 6, the first processing unit may include two slices SLICE3-1 and SLICE3-2, and the second processing unit may include three slices SLICE3-3 to SLICE3-5.

The second core CORE1 may divide the picture 626 into a first processing unit and a second processing unit based on processing complexity of the picture 626. In FIGS. 5 and 6, the first processing unit may include two slices SLICEm-1 and SLICEm-2, and the second processing unit may include three slices SLICEm-3 to SLICEm-5.

Although, each picture 620, 622, 624, . . . , or 626 is illustrated to be divided into a first processing unit and a second processing unit for the two cores CORE0 and CORE1, respectively, for the sake of convenient description of FIGS. 5 and 6, a number of processing units in a picture may vary according to a number of cores for processing the units.

For example, a processing time for processing the three slices SLICE1-3 to SLICE1-5 by the first core CORE0 and a processing time for processing the two slices SLICE2-1 to SLICE2-2 by the second core CORE1 may be substantially same. Here, the meaning of "substantially same" may include "equal, nearly the same, almost the same, or the same with allowable margin of difference".

As shown in FIG. 5, each picture 620, 622, 624, . . . , 626 may include five slices SLICE1-1 to SLICE1-5, SLICE2-1 to SLICE2-5, SLICE3-1 to SLICE3-5, . . . , SLICEm-1 to SLICEm-5 respectively. For example, each picture 620, 622, 624, . . . , 626 may be a frame to encode, an original picture, a raw bitstream of a picture to encode, or a frame to decode, an encoded picture, or an encoded bitstream EB received through the receiver interface 270, etc.

Turning to FIG. 6, in a first time period T11, the first core CORE0 may process the first slice SLICE1-1 and the second slice SLICE1-2 of the first picture 620. In the first time period T11, the first core CORE0 may perform in-loop filtering on a boundary of the slices SLICE1-1 and SLICE1-2 for each block based on a processing result of the slice SLICE1-1.

In a second time period T12, the first core CORE0 may process the third slice SLICE1-3 to the fifth slice SLICE1-5 of the first picture 620, and the second core CORE1 may process the first slice SLICE2-1 and the second slice SLICE2-2 of the second picture 622. The processing of the third slice SLICE1-3 to the fifth slice SLICE1-5 and the processing of the first slice SLICE2-1 and the second slice SLICE2-2 may be performed in parallel in the second time period T12.

In the second time period T12, the first core CORE0 may perform in-loop filtering on a boundary of the slices SLICE1-2 and SLICE1-3 for each block based on the processing result of the slices SLICE1-2. In the second time period T12, the first core CORE0 may perform in-loop filtering on a boundary of the slices SLICE1-3 and SLICE1-4 for each block based on the processing result of the slice SLICE1-3 and may perform in-loop filtering on a boundary of the slices SLICE1-4 and SLICE1-5 for each block based on the processing result of the slice SLICE1-4. In addition, in the second time period T12, the second core CORE1 may perform in-loop filtering on a boundary of the slices SLICE2-1 and SLICE2-2 for each block based on the processing result of the slice SLICE2-1.

That is, in the second time period T12, the first core CORE0 may perform in-loop filtering for the three slices SLICE1-3 to SLICE1-5 and the second CORE1 may perform in-loop filtering for the two slices SLICE2-1 and SLICE2-2 so that no additional time is used for in-loop filtering, for example, no additional time for gathering distributed slices over the first core CORE0 and the second core CORE1.

In a third time period T13, the first core CORE0 may process the first slice SLICE3-1 and the second slice SLICE3-2 of the third picture 624. In the third time period T13, the first core CORE0 may perform in-loop filtering on a boundary of the slices SLICE3-1 and SLICE3-2 for each block based on the processing result of the slice SLICE3-1.

In the third time period T13, the first core CORE0 may process the first slice SLICE3-1 and the second slice SLICE3-2 of the third picture 624, and the second core CORE1 may process the third slice SLICE2-3 to the fifth slice SLICE2-5 of the second picture 622. The processing of the third slice SLICE2-3 to the fifth slice SLICE2-5 and the processing of the first slice SLICE3-1 and the second slice SLICE3-2 may be performed in parallel in the third time period T13.

In the third time period T13, the first core CORE0 may perform in-loop filtering on a boundary of the slices SLICE3-1 and SLICE3-2 for each block based on the processing result of the slices SLICE3-1. In addition, in the third time period T13, the second core CORE1 may perform in-loop filtering on a boundary of the slices SLICE2-2 and SLICE2-3 for each block based on the processing result of the slices SLICE2-2. In the third time period T13, the second core CORE1 may perform in-loop filtering on a boundary of the slices SLICE2-3 and SLICE2-4 for each block based on the processing result of the slice SLICE2-3 and may perform in-loop filtering on a boundary of the slices SLICE2-4 and SLICE2-5 for each block based on the processing result of the slice SLICE2-4.

That is, in the third time period T13, the first CORE0 may perform in-loop filtering for the two slices SLICE3-1 and SLICE3-2, and the second core CORE1 may perform in-loop filtering for the three slices SLICE2-3 to SLICE2-5 so that no additional time is used for in-loop filtering, for example, no additional time for gathering distributed slices over the first core CORE0 and the second core CORE1.

Figure 7:
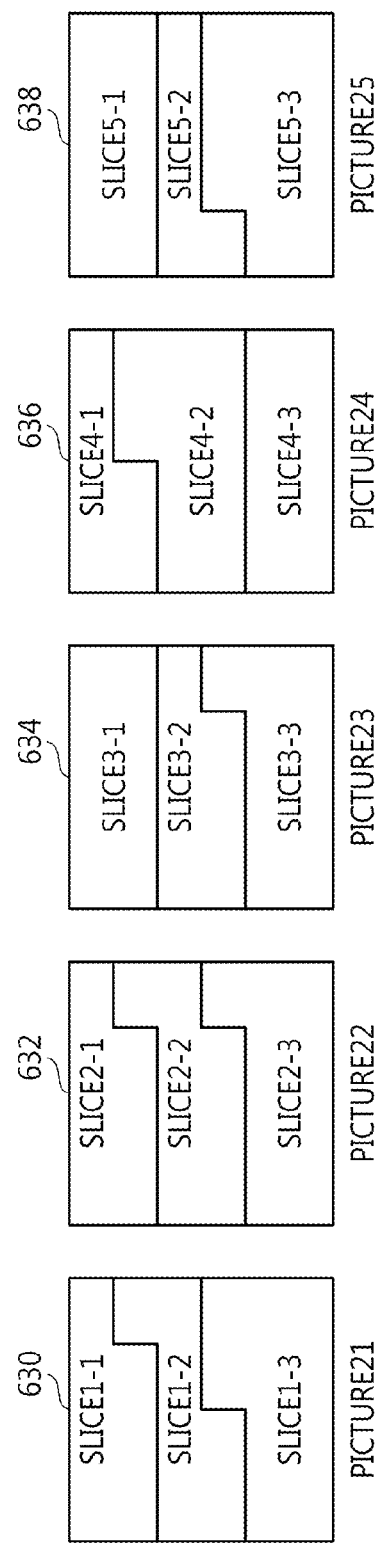
FIG. 7 is a conceptual diagram illustrating a sequence of pictures including three slices respectively.
Figure 8:
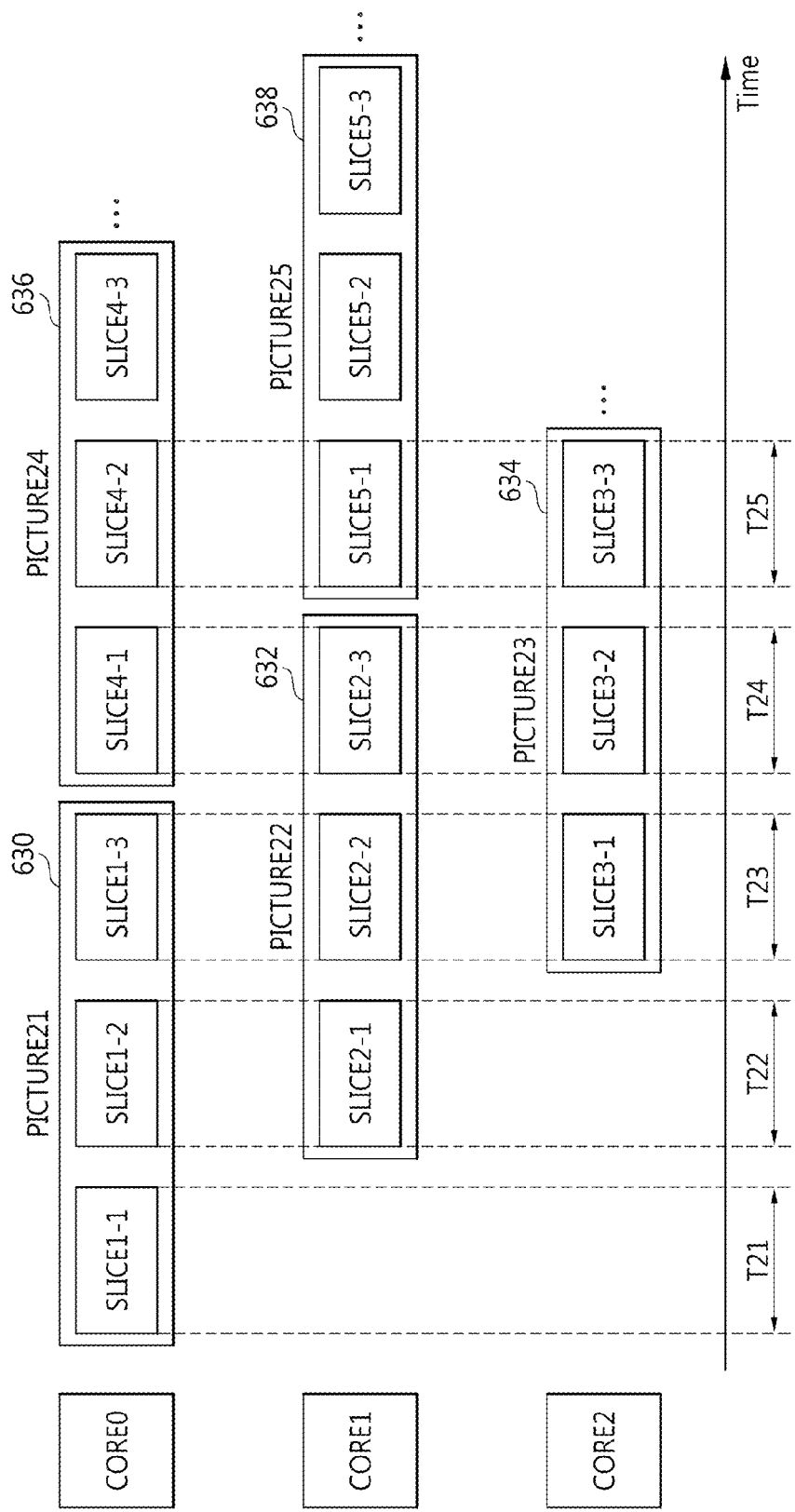
FIG. 8 is a conceptual diagram illustrating a procedure to process the sequence of pictures shown in FIG. 7 by three cores.

FIG. 7 is a conceptual diagram illustrating a sequence of pictures including three slices respectively. FIG. 8 is a conceptual diagram illustrating a procedure to process the sequence of pictures shown in FIG. 7 by three cores.

The controller 200A shown in FIG. 1 may include three hardware codecs 230-1, 230-2 and 230-3 that may correspond to a first core CORE0, a second CORE1 and a third core CORE2, respectively. The encoder or/and decoder described in FIG. 2 may be embedded in each of the cores CORE0, CORE1 and CORE2.

As shown in FIG. 7, each picture 630, 632, 634, 636, and 638 may include three slices, respectively. Each picture 630, 632, 634, 636, and 638 may include a first processing unit, a second processing unit and a third processing unit. That is, each of the first processing unit, the second processing unit and the third processing unit may correspond to one of the three slices, respectively. Each picture 630, 632, 634, 636, and 638 may be a frame to encode, an original picture, a raw bitstream of a picture to encode, a frame to decode, an encoded picture, or an encoded bitstream EB received through the receiver interface 270, etc.

Turning to FIG. 8, in a first time period T21, the first core CORE0 may process the first slice SLICE1-1 of the first picture 630.

In a second time period T22, the first core CORE0 may process the second slice SLICE1-2 of the first picture 630, and the second core CORE1 may process the first slice SLICE2-1 of the second picture 632. The processing of the second slice SLICE1-2 and the processing of the first slice SLICE2-1 may be performed in parallel in the second time period T22.

In the second time period T22, the first core CORE0 may perform in-loop filtering on a boundary of the slices SLICE1-1 and SLICE1-2 for each block based on the processing result of the slice SLICE1-1.

For parallel processing, a one (1) slice delay may be assigned to the second core CORE1 and a two (2) slice delay may be assigned to the third core CORE2.

In a third time period T23, the first core CORE0 may process the third slice SLICE1-3 of the first picture 630, the second core CORE1 may process the second slice SLICE2-2 of the second picture 632, and the third core CORE2 may process the first slice SLICE3-1 of the third picture 634.

In the third time period T23, the processing of the third slice SLICE1-3, the processing of the second slice SLICE2-2 and the first slice SLICE1-3 may be performed in parallel in the third time period T23.

In the third time period T23, the first core CORE0 may perform in-loop filtering on a boundary of the slices SLICE1-2 and SLICE1-3 for each block based on the processing result of the slice SLICE1-2, and the second core CORE1 may perform in-loop filtering on a boundary of the slices SLICE2-1 and SLICE2-2 for each block based on the processing result of the slice SLICE2-1.

In a fourth time period T24, the first core CORE0 may process a first slice SLICE4-1 of the fourth picture 636, the second core CORE1 may process the third slice SLICE2-3 of the second picture 632, and the third core CORE2 may process the second slice SLICE3-2 of the third picture 634. That is, once the first core CORE0 finishes processing the slices of the first picture 630, the first core CORE0 precedes to the next picture in the sequence of pictures, in this case the fourth picture 636.

In the fourth time period T24, the processing of the first slice SLICE4-1, the processing of the third slice SLICE2-3 and the processing of the second slice SLICE3-2 may be performed in parallel.

In the fourth time period T24, the second core CORE1 may perform in-loop filtering on a boundary of the slices SLICE2-2 and SLICE2-3 for each block based on the processing result of the slice SLICE2-2, and the third core CORE2 may perform in-loop filtering on a boundary of the slices SLICE3-1 and SLICE3-2 for each block based on the processing result of the slice SLICE3-1.

In a fifth time period T25, an operation of each core of the cores CORE0, CORE1, and CORE2 may continue to process respective slices in a similar way as in the operation in the first through fourth time periods T21-T24.

Figure 9:
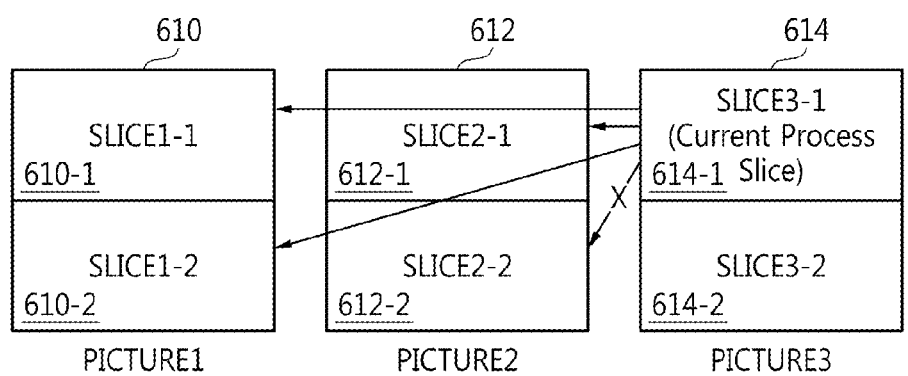
FIG. 9 is a conceptual diagram illustrating a motion vector search according to an exemplary embodiment.

FIG. 9 is a conceptual diagram illustrating a motion vector search. Referring to FIGS. 3, 4, and 9, when a current processing slice is a first slice 614-1 of a third picture 614, the first core CORE0 may search processed slices 610-1, 610-2 and 612-1 to find the best motion vector. For example, as each of the slices 612-2 and 614-1 is processed in parallel by the different cores CORE0 and CORE1, the first core cannot refer to the second slice 612-2 of the second picture 612 which is now being processed. Also the slice 614-1 may not be able to refer to few bottom pixels of slice 612-1 as the edge between slice 612-1 and 612-2 may be under in-loop filtering operation at the time of processing of slice 614-1 (In the H.264 standard, the few bottom pixels may be 6 pixels).

The data processing system 100A may encode the third picture 614 to avoid or reduce the dependency among the slices SLICE2-2 and SLICE3-1 in parallel processing by determining a reference picture and a coordinate of a matching block (or a reference block) based on the dependency. For example, when the first slice 614-1 is encoded, a motion vector of a macro block in the first slice 614-1 may be determined to avoid dependency by making the macro block refer to one of the slices 610-1, 610-2 and 612-1 instead of the second slice 612-2 with some restriction of the bottom pixels being processed by the in-loop filtering operation. As a result, the dependency in parallel processing may be reduced.

The data processing system 100A may generate and refer to a motion constraint slice group to reduce dependency between slices processed in parallel when the slices are encoded. The motion constraint slice group may include information to restrict a reference picture or a reference region of a previous picture which is referred to by a current processing slice. The motion constraint slice group may be stored in a memory 301, 303 or 305 in the data processing system 100A, or in a memory in each of the cores 230-1 to 230-N.

Figure 10:
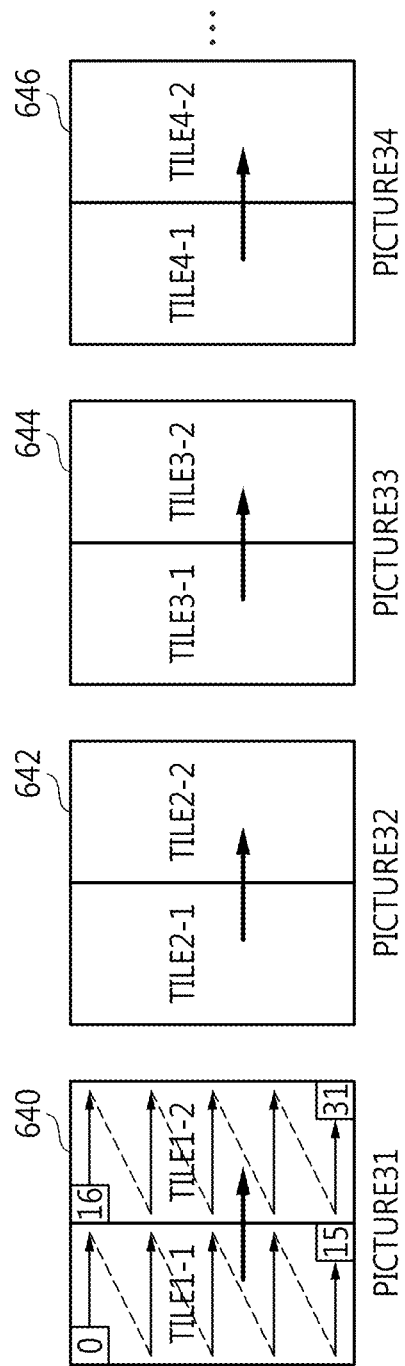
FIG. 10 a conceptual diagram illustrating a sequence of pictures each of which includes two tiles according to exemplary embodiment.
Figure 11:
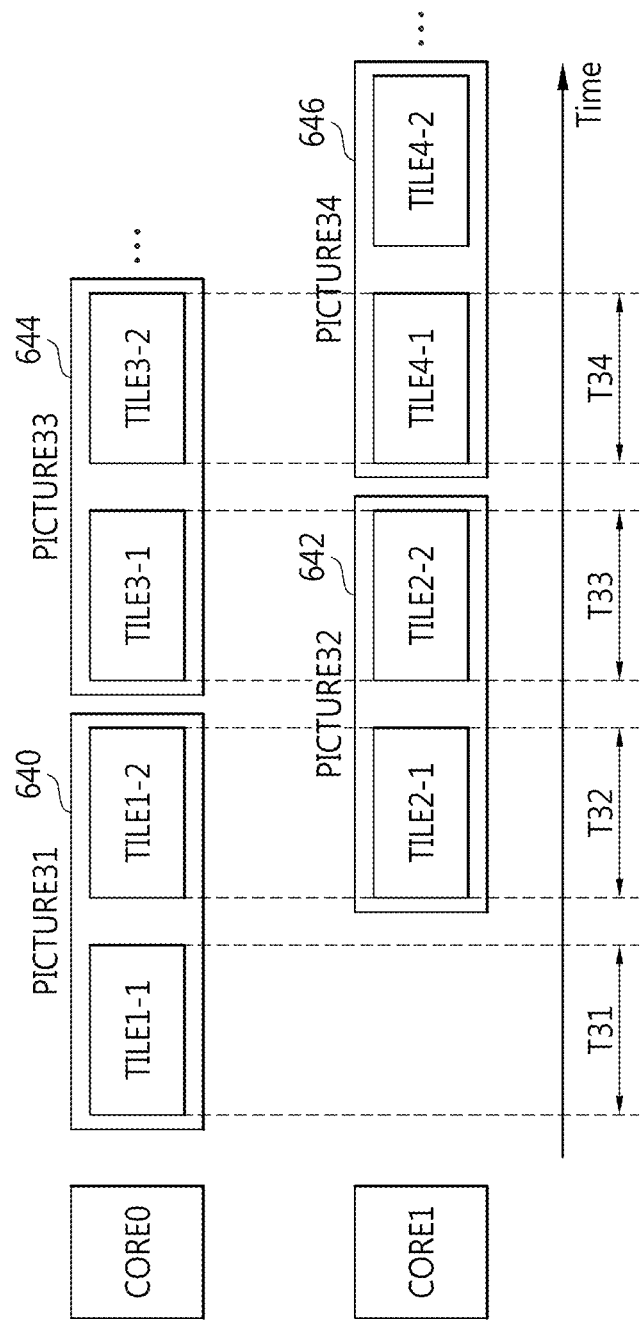
FIG. 11 a conceptual diagram illustrating a procedure to process the sequence of pictures shown in FIG. 10 by two cores.

FIG. 10 a conceptual diagram illustrating a sequence of pictures each of which includes two tiles according to exemplary embodiment. FIG. 11 a conceptual diagram illustrating a procedure to process the sequence of pictures shown in FIG. 10 by two cores.

An arrow shown in each of a plurality of pictures 640, 642, 644 and 646 illustrate a processing direction or a processing order of a plurality of tiles in the plurality of pictures 640, 642, 644 and 646.

The controller 200A in FIG. 1 may include two hardware codecs 230-1 and 230-2. A first core CORE0 may be a first hardware codec 230-1 and a second core CORE1 may be a second hardware codec 230-2. In some exemplary embodiments, all tiles in a picture may be processed by a single core.

Referring to FIG. 10, each of the plurality of pictures 640, 642, 644, 646 may include two tiles TILE1-1 and TILE1-2, TILE2-1 and TILE2-2, TILE3-1 and TILE3-2, and TILE4-1 and TILE4-2, respectively. Each of tiles TILE1-1 and TILE1-2, TILE2-1 and TILE2-2, TILE3-1 and TILE3-2, and TILE4-1 and TILE4-2 may include one or more blocks. Each of the plurality of pictures 640, 642, 644, 646 may include a first processing unit TILE1-1, TILE2-1, TILE3-1 and TILE4-1, and a second processing unit TILE1-2, TILE2-2, TILE3-2 and TILE4-2. That is, for example, a first processing unit of picture 640 includes TILE1-1, and a second processing unit of picture 640 includes TILE1-2. Here, each of the plurality of pictures 640, 642, 644, 646 may be a frame to encode, an original picture, a raw bitstream of a picture to encode, a frame to decode, an encoded picture, or an encoded bitstream EB received through the receiver interface 270, etc.

Operations of the first core CORE0 and the second core CORE1 will be described in reference to FIGS. 1, 2, 10 and 11.

In a first time period T31, the first core CORE0 may process the first tile TILE1-1 of the first picture 640. For parallel processing, a tile delay may be assigned to the second core CORE1.

In a second time period T32, the first core CORE0 may process the second tile TILE1-2 of the first picture 640 and the second core CORE1 may process the first tile TILE2-1 of the second picture 642. The processing of the first tile TILE2-1 and the second tile TILE1-2 may be performed in parallel in the second time period T32. As in the case discussed above, here, "parallel" denotes that there is some overlap in the processing of the first tile TILE2-1 and the second tile TILE1-2. That is, while dotted lines are used in FIGS. 4, 6, 8, 11, 14, these lines are only provided for ease of description and are not intended to suggest that the start times or the end times for processing exactly coincide. For example, the dotted lines in FIG. 11 are not intended to suggest that the start times or the end times for processing the first tile TILE2-1 and the second tile TILE1-2 exactly coincide. However, in some exemplary embodiments, the start times may exactly coincide and/or the end times may exactly coincide.

In addition, in the second time period T32, the first core CORE0 may perform in-loop filtering on a boundary of the tiles TILE1-1 and TILE1-2 for each block based on a processing result of the first tile TILE1-1 in the first picture 640. That is, in the second time period T32, the first CORE0 may perform a processing of the second tile TILE1-2 and in-loop filtering of the tiles TILE1-1 and TILE1-2 so that no additional time is used for in-loop filtering.

In a third time period T33, the first core CORE0 may process the first tile TILE3-1 of the third picture 644 and the second core CORE1 may process the second tile TILE2-2 of the second picture 642. The processing of the first tile TILE3-1 and the second slice TILE2-2 may be performed in parallel in the third time period T33.

In addition, in the third time period T33, the second core CORE1 may perform in-loop filtering on a boundary of the tiles TILE2-1 and TILE2-2 for each block based on a processing result of the first tile TILE2-1 in the second picture 642. That is, in the third time period T33, the second CORE1 may perform a processing of the second tile TILE2-2 and in-loop filtering of the tiles TILE2-1 and TILE2-2 so that no additional time is used for in-loop filtering.

In a fourth time period T34, each core of the cores CORE0, and CORE1 may continue to process respective tiles in a similar way as in the operation in the third time period T33.

Figure 12:
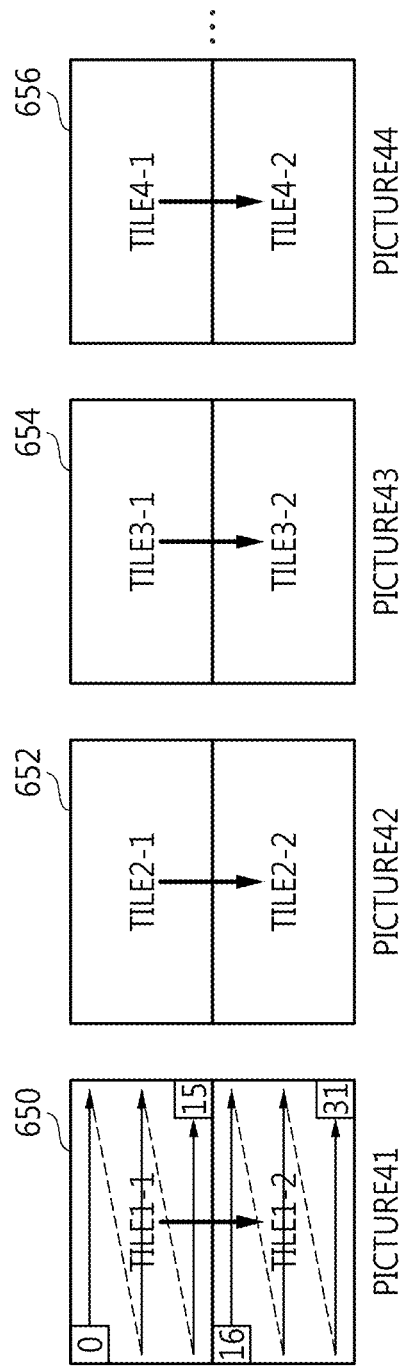
FIG. 12 is a conceptual diagram illustrating a sequence of pictures each of which include two tiles respectively.

FIG. 12 is a conceptual diagram illustrating a sequence of pictures each of which includes two tiles partitioned using horizontal partitioning respectively.

An arrow shown in each of a plurality of pictures 650, 652, 654 and 656 illustrates a processing direction or a processing order of a plurality of tiles in the plurality of pictures 650, 652, 654 and 656.

The controller 200A in FIG. 1 may include two hardware codecs 230-1 and 230-2. A first core CORE0 may be a first hardware codec 230-1 and a second core CORE1 may be a second hardware codec 230-2. Operations of the first core CORE0 and the second core CORE1 will be described in reference to FIGS. 1, 2, 11 and 12.

Referring to FIG. 12, each of the plurality of pictures 650, 652, 654, 656 may include two tiles TILE1-1 and TILE1-2, TILE2-1 and TILE2-2, TILE3-1 and TILE3-2, and TILE4-1 and TILE4-2, respectively. Each of the tiles TILE1-1 and TILE1-2, TILE2-1 and TILE2-2, TILE3-1 and TILE3-2, and TILE4-1 and TILE4-2 may include one or more blocks. Each of the plurality of pictures 650, 652, 654, 656 may include a first processing unit TILE1-1, TILE2-1, TILE3-1 and TILE4-1, respectively, and a second processing unit TILE2-1, TILE2-2, TILE3-2 and TILE4-2, respectively. Here, each of the plurality of pictures 650, 652, 654, 656 may be a frame to encode, an original picture, a raw bitstream of a picture to encode, or a frame to decode, an encoded picture, or an encoded bitstream EB received through the receiver interface 270, etc.

In a first time period T31, the first core CORE0 may process the first tile TILE1-1 of the first picture 650. For parallel processing, a tile delay may be assigned to the second core CORE1.

In a second time period T32, the first core CORE0 may process the second tile TILE1-2 of the first picture 650 and the second core CORE1 may process the first tile TILE2-1 of the second picture 652. The processing of the first tile TILE2-1 and the second tile TILE1-2 may be performed in parallel in the second time period T32.

In addition, in the second time period T32, the first core CORE0 may perform in-loop filtering on a boundary of the tiles TILE1-1 and TILE1-2 for each block based on a processing result of the first tile TILE1-1 in the first picture 650. That is, in the second time period T32, the first CORE0 may perform a processing of the second tile TILE1-2 and in-loop filtering of the tiles TILE1-1 and TILE1-2 so that no additional time is used for in-loop filtering.

In a third time period T33, the first core CORE0 may process the first tile TILE3-1 of the third picture 654 and the second core CORE1 may process the second tile TILE2-2 of the second picture 652. The processing of the first tile TILE3-1 and the second slice TILE2-2 may be performed in parallel in the third time period T33.

In addition, in the third time period T33, the second core CORE1 may perform in-loop filtering on a boundary of the tiles TILE2-1 and TILE2-2 for each block based on a processing result of the first tile TILE2-1 in the second picture 652. That is, in the third time period T33, the second CORE1 may perform a processing of the second tile TILE2-2 and in-loop filtering of the tiles TILE2-1 and TILE2-2 so that no additional time is used for in-loop filtering.

In a fourth time period T34, each core of the cores CORE0, and CORE1 may continue to process respective tiles in a similar way as in the operation in the third time period T33.

Figure 13:
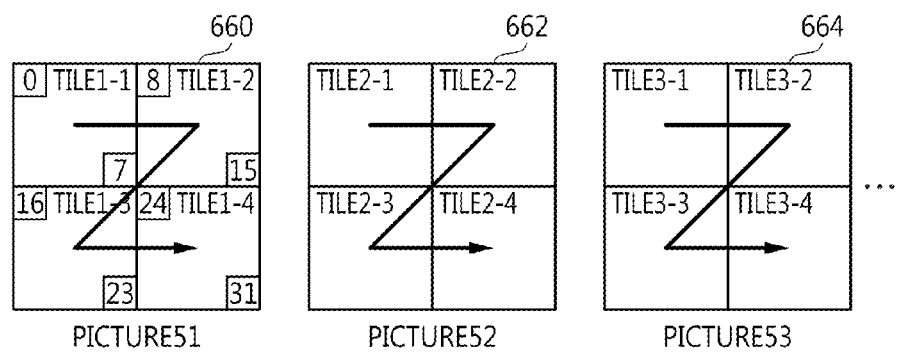
FIG. 13 is a conceptual diagram illustrating a sequence of pictures each of which include four tiles respectively.
Figure 14:
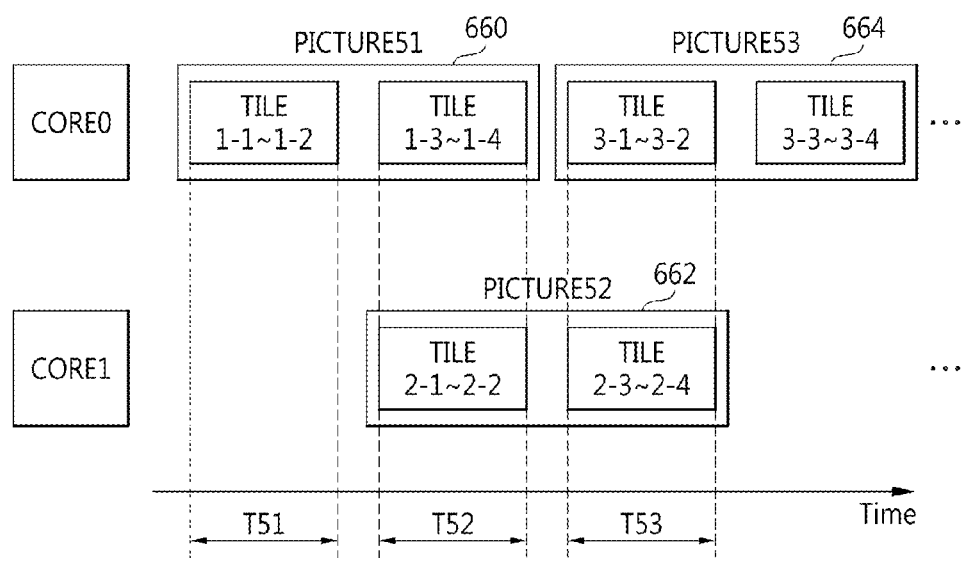
FIG. 14 a conceptual diagram illustrating a procedure to process the sequence of pictures shown in FIG. 13 by two cores.

FIG. 13 is a conceptual diagram illustrating a sequence of pictures each of which include four tiles respectively having both horizontal and vertical partitions. FIG. 14 a conceptual diagram illustrating a procedure to process the sequence of pictures shown in FIG. 13 by two cores.

An arrow shown in each of a plurality of pictures 660, 662, and 664 illustrates a processing direction or a processing order of a plurality of tiles in the plurality of pictures 660, 662, and 664.

The controller 200A in FIG. 1 may include two hardware codecs 230-1 and 230-2. A first core CORE0 may be a first hardware codec 230-1 and a second core CORE1 may be a second hardware codec 230-2. In some exemplary embodiments, all tiles in a picture may be processed by a single core. Operations of the first core CORE0 and the second core CORE1 will be described in reference to FIGS. 1, 2, 13 and 14.

Referring to FIG. 13, each of the plurality of pictures 660, 662, and 664 may include four tiles TILE1-1 to TILE1-4, TILE2-1 to TILE2-4, and TILE3-1 to TILE3-4, respectively. Each of the tiles TILE1-1 to TILE1-4, TILE2-1 to TILE2-4, and TILE3-1 to TILE3-4, may include one or more blocks. Each of the plurality of pictures 660, 662, and 664 may include a first processing unit having two tiles TILE1-1 and TILE1-2, TILE2-1 and TILE2-2, and TILE3-1 and TILE3-2, respectively, and a second processing unit having two tiles TILE1-3 and TILE1-4, TILE2-3 and TILE2-4, and TILE3-3 and TILE3-4, respectively. Here, each of the plurality of pictures 660, 662, and 664 may be a frame to encode, an original picture, a raw bitstream of a picture to encode, a frame to decode, an encoded picture, or an encoded bitstream EB received through the receiver interface 270, etc.

In a first time period T51, the first core CORE0 may process the first tile TILE1-1 and the second tile TILE1-2 of the first picture 660 and perform in-loop filtering on a boundary of the tiles TILE1-1 and TILE1-2 of the first picture 660 for each block based on a processing result of the first tile TILE1-1. For parallel processing, two tile delays may be assigned to the second core CORE1.

In a second time period T52, the first core CORE0 may process the third tile TILE1-3 and fourth tile TILE1-4 of the first picture 660, and the second core CORE1 may process the first tile TILE2-1 and the second tile TILE2-2 of the second picture 662. The processing of the third tile TILE1-3 and fourth tile TILE1-4 and the processing of the first tile TILE2-1 and the second tile TILE2-2 may be performed in parallel in the second time period T52. As in the case discussed above, here, "parallel" denotes that there is some overlap in the processing of the tiles. That is, while dotted lines are used in FIGS. 4, 6, 8, 11, 14, these lines are only provided for ease of description and are not intended to suggest that the start times or the end times for processing exactly coincide. However, in some exemplary embodiments, the start times may exactly coincide and/or the end times may exactly coincide.

In addition, in the second time period T52, the first core CORE0 may perform in-loop filtering on a boundary of the tiles TILE1-1 and TILE1-3 for each block based on a processing result of the first tile TILE1-1 in the first picture 660.

In the second time period T52, the first core CORE0 may perform in-loop filtering on a boundary of the tiles TILE1-2 and TILE1-4 for each block based on a processing result of the first tile TILE1-2 in the first picture 660.

In the second time period T52, the first core CORE0 may perform in-loop filtering on a boundary of the tiles TILE1-3 and TILE1-4 for each block based on a processing result of the first tile TILE1-3 in the first picture 660.

In a second time period T52, the second core CORE1 may perform in-loop filtering on a boundary of the tiles TILE2-1 and TILE2-2 of the second picture 662 for each block based on a processing result of the first tile TILE2-1

That is, the in-loop filtering on the boundaries of the processed tiles are performed in the second time period T52 so that no additional time is used for in-loop filtering.

In a third time period T53, the cores CORE0, and CORE1 may continue to process respective tiles in a similar way as in the operation in the second time period T52.

Figure 15:
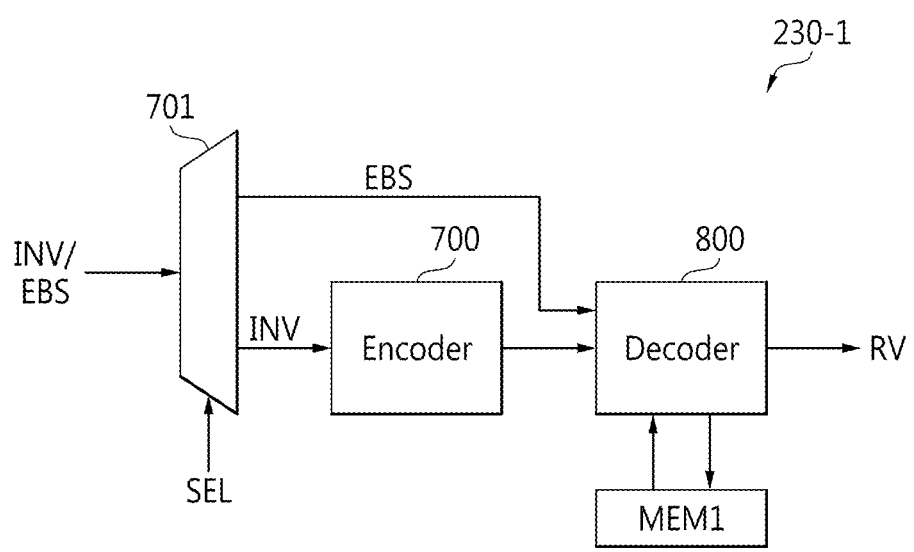
FIG. 15 is a block diagram illustrating a hardware codec of the data processing system shown in FIG. 1.

FIG. 15 is a block diagram illustrating a hardware codec shown in FIG. 1.

Referring to FIGS. 1 and 15, the hardware codec 230-1 may include a selection circuit 701, an encoder 700, a decoder 800 and a memory MEM1.

The selection circuit 701 may output image data or video data INV to the encoder 700 in response to a selection signal SEL when the selection signal SEL has a first level, e.g., a low level. The selection circuit 701 may output an encoded bitstream EB to the decoder 800 in response to a selection signal SEL when the selection signal SEL has a second level, e.g., a high level.

The selection signal SEL may be provided by the CPU 210A. The image data or the video data INV may be provided through the camera interface 250 and the encoded bitstream EB may be provided through the receiver interface 270 or the memory interface 240.

The encoder 700 may encode the output image data or the output video data INV from the selection circuit 701 and output the encoded image data or the encoded video data to the decoder 800 by an encoded bitstream.

The decoder 800 may decode the encoded bitstream EB output from the selection circuit 701 or the encoded bitstream output from the encoder 700, and generate a reconstructed image data or a reconstructed video data RV. The reconstructed image data or a reconstructed video data RV may be displayed on the display 40 through the display interface 260.

In some exemplary embodiments, the encoder 700 or decoder 800 may store the reconstructed image data or the reconstructed video data RV in the memory MEM1. The encoder 700 or decoder 800 may perform in-loop filtering of the stored reconstructed image data or the stored reconstructed video data in the memory MEM1.

In some exemplary embodiments, each of the encoder 700 and the decoder 800 may include in-loop filtering that is defined according to H.264 video coding standard or HEVC video coding standard or any other standard supporting in-loop de-blocking filter.

Figure 16:
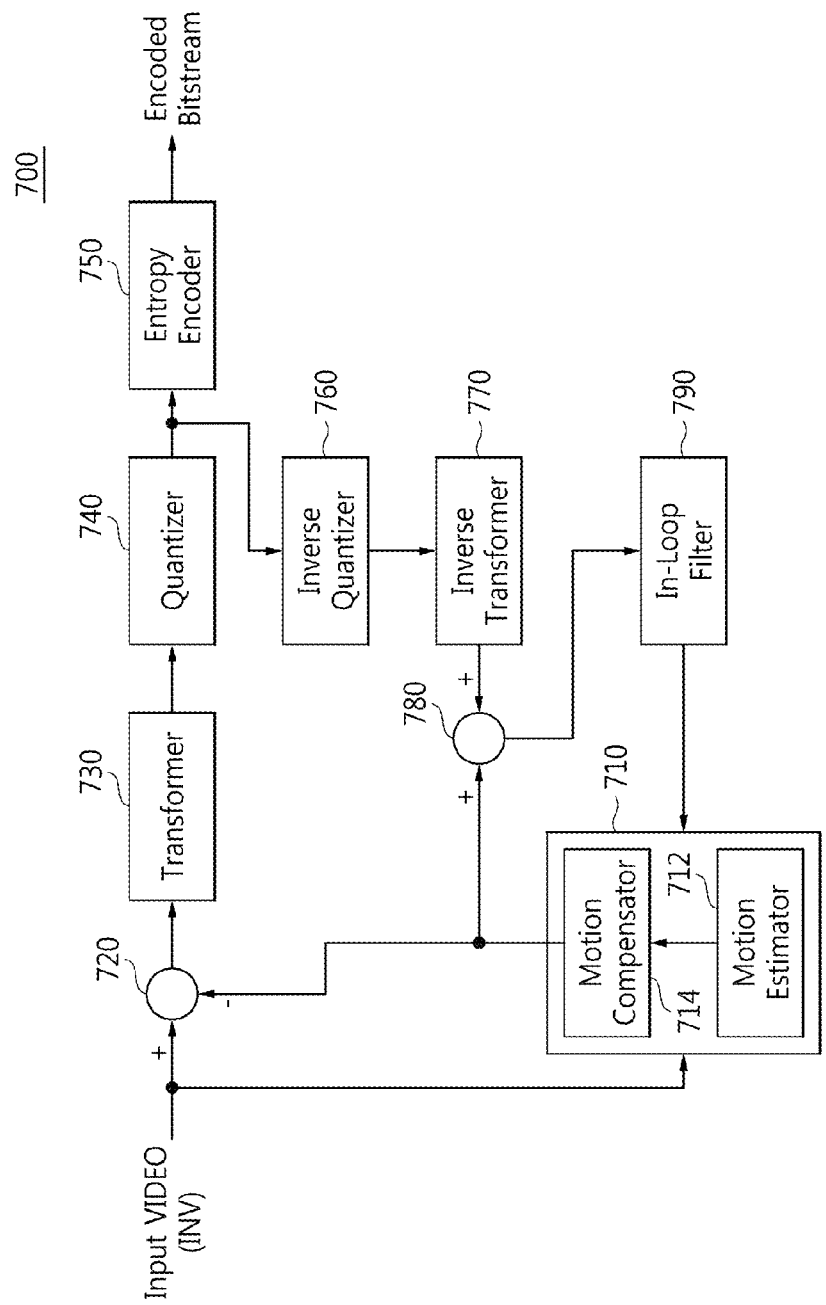
FIG. 16 is a block diagram of an encoder of the hardware codec shown in FIG. 15.

FIG. 16 is a block diagram of an encoder shown in FIG. 15.

Referring to FIGS. 15 and 16, the encoder 700 may include a predictor 710, a subtractor 720, a transformer 730, a quantizer 740, an entropy encoder 750, an inverse quantizer 760, an inverse transformer 770, an adder 780 and an in-loop filter 790.

The predictor 710 may include a motion estimator 712 and a motion compensator 714. The predictor 710 may predict a current block, generate a predicted block and output the predicted block. In particular, the predictor 710 may predict a pixel value of each of pixels in the current block and generate a predicted block including the predicted pixel value of each of the pixels. When an inter prediction is performed, the predictor 710 may include the motion estimator 712 and the motion compensator 714. The motion estimator 712 may be called a motion vector estimator.

The motion estimator 712 or motion vector estimator 712 may estimate a motion vector of a current block based on at least one reference picture by a block corresponding to a block mode or a predefined block mode of the current block, and determine the motion vector of the current block. A size of the block may be 16×16, 16×8, 8×16, 8×8, 8×4, 4×8 or 4×4.

The motion compensator 714 may generate a predicted block based on the motion estimation vector of the current block output from the motion estimator 712, and output the predicted block. That is, the motion compensator 714 may output a block in the reference picture addressed by the current block as a predicted block.

The subtractor 720 may subtract the predicted block from the current block having video data INV, and generate a residual block. The subtractor 720 may calculate a difference between each of pixels of the current block and each of pixels of the predicted block, and generate the residual block including residual signals.

The transformer 730 may transformer the residual signals from time domain to frequency domain, and the quantizer 740 may quantize an output of the transformer 730 and output the quantized residual block. The transformer 730 may use a discrete cosine transform DCT for transforming the residual signals to frequency domain. The residual signals transformed to frequency domain may be a transform coefficient.

The entropy encoder 750 may encode the quantized residual block output from the quantizer 740 and output an encoded bitstream.

The inverse transformer 770 may perform an inverse transform of inverse quantized residual block, and generate a reconstructed residual block.

The adder 780 may add the predicted block from the predictor 710 and the reconstructed residual block output from the inverse transformer 770, and reconstruct the current block.

The in-loop filter 790 may perform in-loop filtering of the reconstructed current block, and output the filtered current block to the predictor 710.

Figure 17:
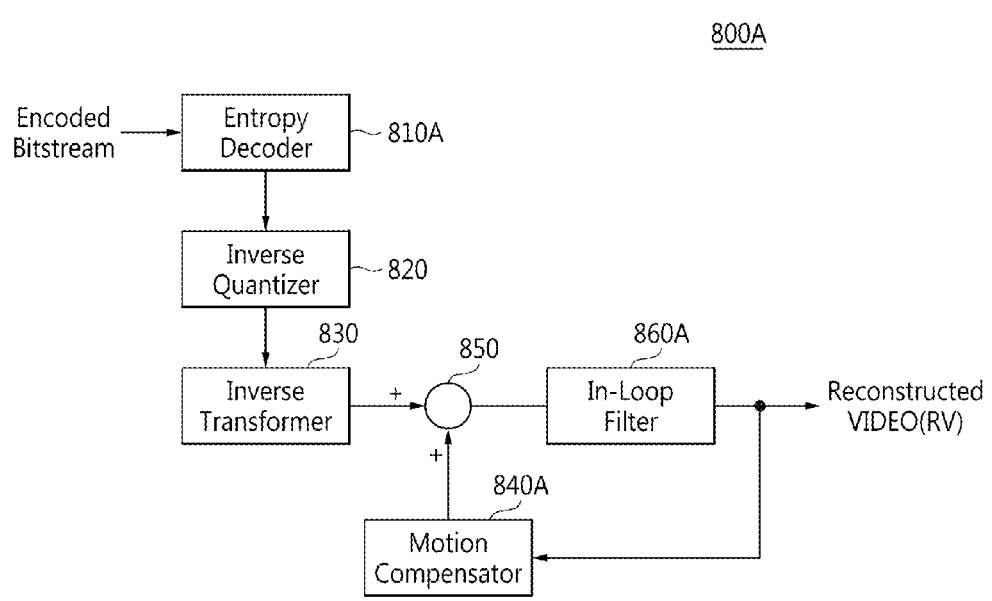
FIG. 17 is a block diagram of a decoder of the hardware codec shown in FIG. 15.

FIG. 17 is a block diagram of a decoder shown in FIG. 15.

Referring to FIGS. 15 to 17, the decoder 800A may include an entropy decoder 810A, an inverse quantizer 820, an inverse transform 830, an adder 850 and an in-loop filter 860A.

The entropy decoder 810A may decode a received encoded bitstream EBS or an encoded bitstream output from the encoder 700, and generate a quantized residual block.

The inverse quantizer 820 may perform an inverse quantization of the quantized residual block output from the entropy decoder 810A, and generate an inverse quantized residual block.

The inverse transform 830 may perform an inverse transform of the inverse quantized residual block, and generate a reconstructed residual block.

The motion compensator 840A may predict a current block based on a motion vector included in the reconstructed block output from the in-loop filter 860A, and output the predicted block.

The adder 850 may reconstruct the current block by adding the reconstructed residual block output from the in-loop filter 860A and the predicted block output from the motion compensator 840A, and output the reconstructed current block.

The in-loop filter 860A may perform in-loop filtering of the reconstructed current block, and output the reconstructed current block RV. That is, the in-loop filter 860A may output the reconstructed video data RV by a block.

In some exemplary embodiments, the in-loop filters 790 and 860A may each include a de-blocking filter and a sample adaptive offset (SAO) filter.

FIGS. 18 to 22 are conceptual diagrams illustrating a method of processing video data by modifying motion compensation information according to exemplary embodiments.

Referring to FIGS. 3, 4, 7, 8 and 18 to 22, each picture 610, 612, 614, 630, 632 or 634 may include a divided region which can be encoded or decoded independently. The divided region may include at least one slice. It is noted that in the following description of FIGS. 18-22, not all pictures and slices will be described for conciseness. For example, pictures 616 (FIG. 3), 636 and 638 (FIG. 7) and slice SLICE1-3 (FIG. 7) are not explicitly described here. Moreover, the method of processing video data illustrated in FIGS. 18-22 is described with respect to slices. However, the method is also applicable to exemplary embodiments related to tiles.

A first picture 610 or 630 may include a first slice SLICE1-1 and a second slice SLICE1-2, a second picture 612 and 632 may include a third slice SLICE2-1 and a fourth slice SLICE2-2, and a third picture 614 and 634 may include a fifth slice SLICE3-1 and a sixth slice SLICE3-2.

Figure 18:
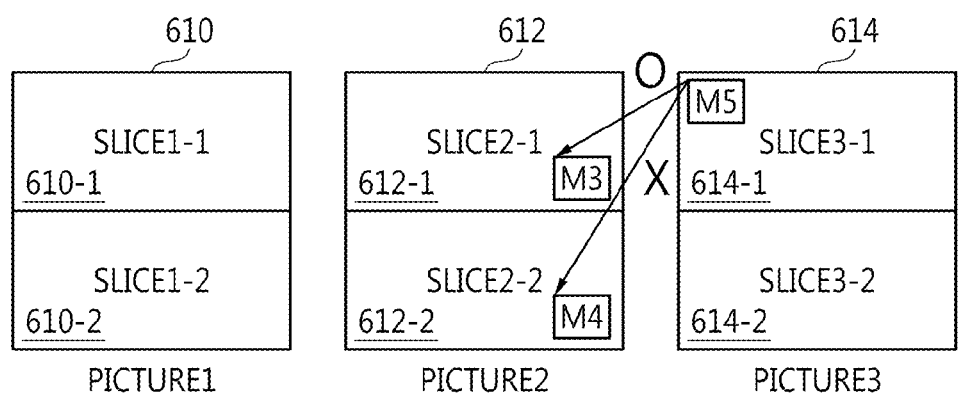
FIGS. 18 and 22 are conceptual diagrams illustrating a method of processing video data by modifying motion compensation information according to exemplary embodiments.

As illustrated in FIG. 18, each of the fifth slice SLICE3-1, the third slice SLICE2-1 and the fourth SLICE2-2 may include a fifth macro-block M5, a third macro-block M3 and a fourth macro-block M4, respectively.

When the third picture 614 or 634 is decoded by the first core CORE0 (in FIG. 4) or the third core CORE2 (in FIG. 8), the decoder 800 or 800A may extract first motion compensation information from an encoded bitstream corresponding to the fifth macro-block M5. The first motion compensation may include a reference picture index and/or a reference coordinate. The first motion compensation information may include reference information such as a reference index or a motion vector which conforms to a motion processing standard specification such H.264 or HEVC.

Referring to FIG. 18, when first motion compensation information of the fifth macro-block M5 in the fifth slice SLICE3-1 refers to a coordinate in the fourth slice SLICE2-2 of the second picture 612 which is decoded in parallel with the fifth slice SLICE3-1, a decoding operation of the fourth slice SLICE2-2 may be not finished. Therefore, the data processing system 100A may modify the first compensation information, for example, a reference coordinate, to avoid decoding dependency between the fourth macro-block M4 in the fourth slice SLICE2-2 and the fifth macro-block M5 in the fifth slice SLICE3-1.

For example, the data processing system 100A may modify an X-axis value while maintaining a Y-axis value in the reference coordinate of the first motion compensation information. That is, the data processing system 100A may modify the reference coordinate to refer to the third macro-block M3 in the bottom of the third slice SLICE2-1 for decoding the fifth macroblock M5. Thus, the data processing system 100A may decode the fifth slice SLICE3-1 by referring to the third macro-block M3 in the third slice SLICE2-1 instead of the fourth macro-block M4 in the fourth slice SLICE2-2.

By modifying the motion compensation information for decoding a macro-block, there may be error in decoding result of the macro-block. A method of reducing the decoding error caused by modifying the motion compensation information will be described later with reference to FIGS. 23A and 23B.

Figure 19:
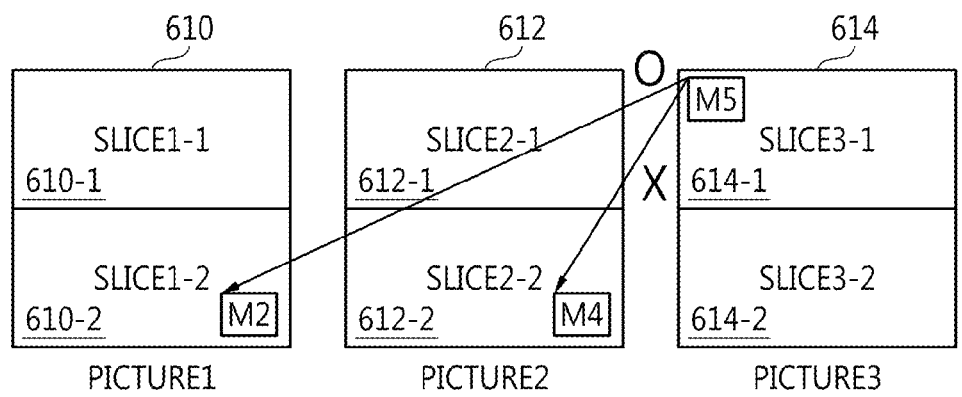

Referring to FIG. 19, as described in FIG. 18, when first motion compensation information of the fifth macro-block M5 in the fifth slice SLICE3-1 refers to a coordinate in the fourth slice SLICE2-2 of the second picture 612 which is decoded in parallel with the fifth slice SLICE3-1, a decoding operation of the fourth slice SLICE2-2 may be not finished. Therefore, the data processing system 100A may modify the first compensation information, for example, a reference picture index, to avoid decoding dependency between the fourth macro-block M4 in the fourth slice SLICE2-2 and the fifth macro-block M5 in the fifth slice SLICE3-1.

For example, the data processing system 100A may modify the reference picture index of the first motion compensation information while maintaining a reference coordinate of the first motion compensation information. That is, the data processing system 100A may modify the reference picture index to refer to the second macro-block M2 in the second slice SLICE1-2 for decoding the fifth macroblock M5, as shown in FIG. 19. Thus, the data processing system 100A may decode the fifth slice SLICE3-1 by referring to the second macro-block M2 in the second slice SLICE1-2 instead of the fourth macro-block M4 in the fourth slice SLICE2-2.

Figure 20:
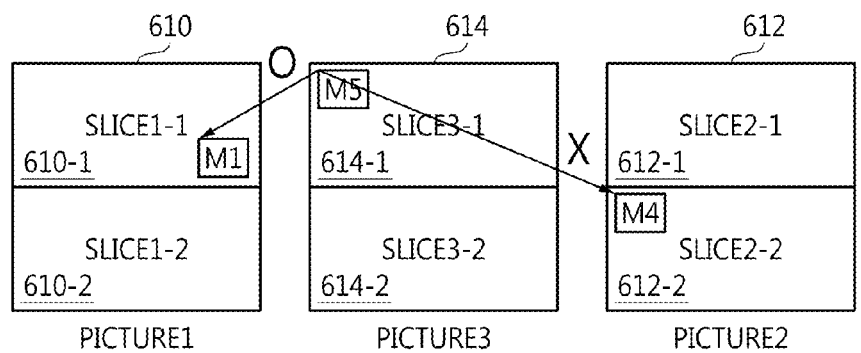

Referring to FIG. 20, the third picture 614 may be a picture displayed before the second picture 612 and decoded after the second picture 612. In such a case, first motion compensation information of the fifth macro-block M5 in the fifth slice SLICE3-1 may refer to the first picture 610 and the second picture 612 in a bidirectional way as reference pictures. When the fifth macro block M5 in the fifth slice SLICE3-1 refers to the first macro block M1 in the first slice SLICE1-1 and the fourth block M4 in the fourth macro-block in the fourth slice SLICE2-2, a decoding operation of the fourth slice SLICE2-2 may not be finished. Therefore, the data processing system 100A may modify the first compensation information, for example, reference picture indexes, to avoid decoding dependency between the fourth macro-block M4 in the fourth slice SLICE2-2 and the fifth macro-block M5 in the fifth slice SLICE3-1.

For example, the data processing system 100A may modify the reference picture indexes of the first motion compensation information. That is, the data processing system 100A may modify the first compensation information from the bidirectional reference to a unidirectional reference. Thus, the data processing system 100A may decode the fifth macro-block M5 in the fifth slice SLICE3-1 by referring to only the first macro-block M1 in the first slice SLICE1-1 without referring to the fourth macro-block M4 in the fourth slice SLICE2-2.

Figure 21:
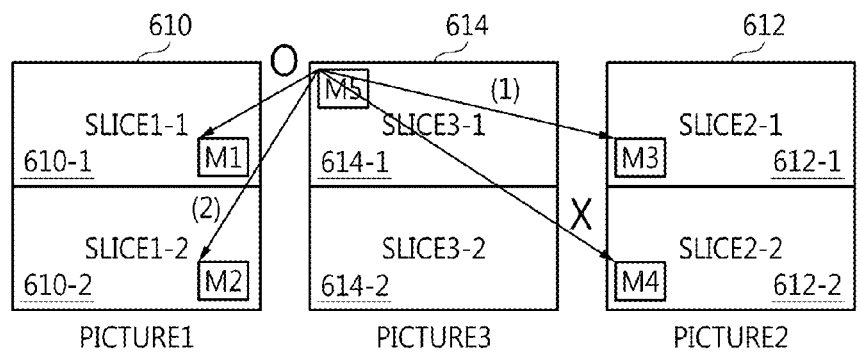

Referring to FIG. 21, the third picture 614 may be a picture displayed before the second picture 612 and decoded after the second picture 612. First motion compensation information of the fifth macro-block M5 in the fifth slice SLICE3-1 may refer to the first picture 610 and the second picture 612 in a bidirectional way as reference pictures. When the fifth macro-block M5 in the fifth slice SLICE3-1 refers to the first macro block M1 in the first slice SLICE1-1 and the fourth macro block M4 in the fourth slice SLICE2-2, a decoding operation of the fourth slice SLICE2-2 may be not finished. Therefore, the data processing system 100A may modify the first compensation information, for example, reference picture indexes and a reference coordinate, to avoid decoding dependency between the fourth macro-block M4 in the fourth slice SLICE2-2 and the fifth macro-block M5 in the fifth slice SLICE3-1.

For example, the data processing system 100A may modify the reference picture indexes and the reference coordinate of the first motion compensation information to refer to the third macro-block M3 in the third slice SLICE2-1 (1) or the second macro-block M2 in the second slice SLICE1-2 (2). That is, the data processing system 100A may modify the first compensation information by maintaining the bidirectional reference. Thus, the data processing system 100A may decode the fifth macro-block M5 in the fifth slice SLICE3-1 by referring to the first macro-block M1 in the first slice SLICE1-1 and one of the third macro-block M3 in the third slice SLICE2-1 or the second macro-block M2 in the second slice SLICE1-2.

Figure 22:
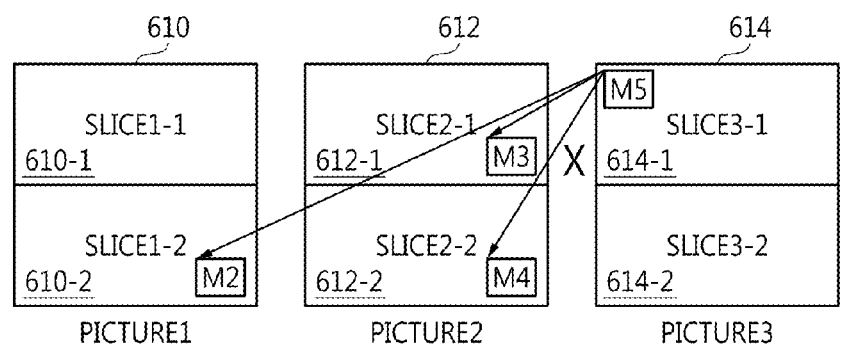

Referring to FIG. 22, when first motion compensation information of the fifth macro-block M5 in the fifth slice SLICE3-1 refers to the fourth block M4 in the fourth macro-block in the fourth slice SLICE2-2, a decoding operation of the fourth slice SLICE2-2 may not be finished. Therefore, the data processing system 100A may modify the first compensation information, for example, a reference picture index and a reference coordinate, to avoid decoding dependency between the fourth macro-block M4 in the fourth slice SLICE2-2 and the fifth macro-block M5 in the fifth slice SLICE3-1.

For example, the data processing system 100A may modify the reference picture index of the first motion compensation information with the same reference coordinate to refer to the second macro-block M2 in the second slice SLICE1-2 and the third macro-block M3 in the third slice SLICE2-1. That is, the data processing system 100A may modify the first compensation information from the unidirectional reference to a bidirectional reference. Thus, the data processing system 100A may decode the fifth macro-block M5 in the fifth slice SLICE3-1 by referring to the second macro-block M2 in the second slice SLICE1-2 and the third macro-block M3 in the third slice SLICE2-1.

For the sake of easy understanding, FIGS. 18 to 22 describes that the fifth macro-block M5 refers to other macro-blocks, for example, M1, M2 or M3, etc. However, a reference block (e.g., M1, M2, or M3, etc.) referred to by the fifth macro-block M5 may be any block different from a macro-block according to a video coding standard, and a block size of the reference block (e.g., M1, M2, or M3, etc. referred to by the fifth block M5 may be equal to or different from the block size of the fifth block M5.

For example, when the block size of the fifth macro-block M5 is 16 by 16, the block size of a reference block (e.g., M1, M2, or M3, etc.) referred to by the fifth macro-block M5 may be 4 by 4. Thus, the reference block referred to by the fifth macro-block M5 may not always be a macro block having the same block size and may be a sub-block smaller than the macro block or any combination of sub-blocks. For example, assuming in FIG. 18 that the block size of the fifth macro-block M5 is 16×16, the motion compensation information of the fifth macro-block M5 may be modified to refer to the third macro-block M3 whose size is 4×4.

In addition, motion compensation information of a macro-block may correspond to a unit of a macro-block or a unit of a sub-block smaller than the unit of the macro-block. Thus, motion compensation information corresponding to a macro-block may include a plurality of motion compensation information corresponding to a plurality of sub-blocks included in the macro-block.

As described in the method of processing video data by modifying motion compensation information in FIGS. 18 to 22, the divided region in each picture 610, 612, 614, 630, 632 or 634 may include at least one slice. However, as discussed above, the method may also be applied to tiles. In case that the divided region includes a plurality of tiles, the data processing system 100A may modify motion compensation information by changing at least one of an X-axis value and a Y-axis value of a reference coordinate when the reference coordinate in a reference picture is changed according to divided format of the plurality of tiles.

Referring to FIGS. 18 to 22, the method of processing video data by the data processing system 100A may modify the motion compensation information according to a number of reference pictures, a value of a motion vector and/or a boundary matching error estimation value. The boundary matching error estimation value denotes a difference in the pixel values on the boundary between adjacent decoded blocks before a de-blocking operation.

For example, the data processing system 100A may modify the motion compensation information of a current decoding block which is selected for decoding to refer to the most recent prior picture for a reference picture, when there are a plurality of reference picture candidates. On the other hand, the data processing system 100A may modify the motion compensation information of the current decoding block to refer to a reference picture or a reference coordinate (or motion vector) which can make the motion vector smallest. Alternatively, when a plurality of macro-block or sub-block candidates may be referred to for decoding the current decoding block, the data processing system 100A may modify the motion compensation information of the current decoding block to refer to one of the macro-block or the sub-block candidates, which has minimum difference in the pixel values on the boundary between adjacent decoded macro-blocks or adjacent decoded sub-blocks before a de-blocking operation. Here, the pixel value may denote the pixel data, and may have a format according to one of data formats such as, for example, RGB, YUV or YcbCr, etc.

The method of processing video data described in FIGS. 18 to 22 may cause errors in pixel values of a constructed macro-block because the modification of a motion compensation vector of a current decoding block changes a reference picture or a reference coordinate (or motion vector) that are defined by encoding the video data and therefore makes the current decoding block refer to a different macro-block other than an original macro-block defined by an original motion compensation information before generating a modified motion compensation information. Thus, the pixels in the constructed macro-block may have pixel errors even in the case in which the data processing system assigns a macro-block having similar pixel values to an original reference macro-block.

The errors in pixel values may cause unnatural boundary display on the boundaries between reconstructed blocks. Here, the errors in pixel values in the reconstructed block may spread over other blocks adjacent to the reconstructed block by performing in-loop filtering on the block boundaries.

According to an exemplary embodiment, the errors in pixel values of the reconstructed blocks generated by modifying the motion compensation information of the reconstructed blocks may be prohibited from spreading over other adjacent blocks on the boundaries of the reconstructed blocks. The partial in-loop filtering that addresses the disadvantageous spread of errors at boundaries will be described in detail later with reference to FIGS. 23A and 23B.

Although the method for processing video data by modifying motion compensation information described in FIGS. 18 to 22 illustrates that each picture 610, 612 and 614 includes a plurality of slices each of which is a processing unit, the method for processing video data may apply to each picture 610, 612 and 614 having only one divided region, and particularly only one slice. In addition, the method for processing video data by modifying motion compensation information may be used when a plurality of divided regions in a picture, for example, slices or tiles, are decoded by a plurality of cores.

For example, the data processing system 100A may modifying first motion compensation information of current decoding blocks in a picture having only one slice to make the current decoding blocks refer to a region in a reference picture where a decoding operation is finished even in the case in which the whole region of the reference picture is not decoded yet, or to make the current decoding blocks refer to a picture whose decoding is finished.

Figure 23A:
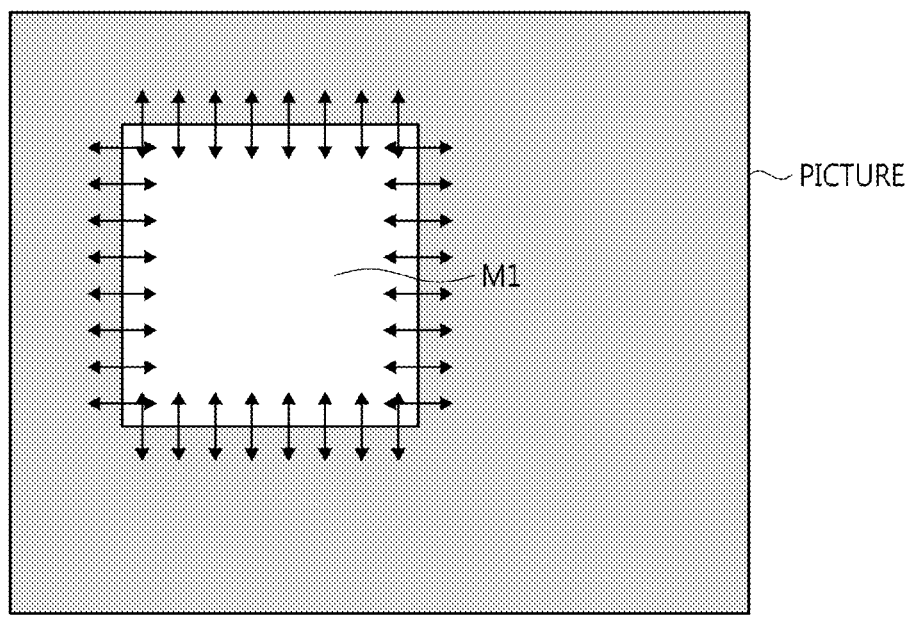
FIGS. 23A and 23B are conceptual diagrams illustrating partial in-loop filtering according to an exemplary embodiment.
Figure 23B:
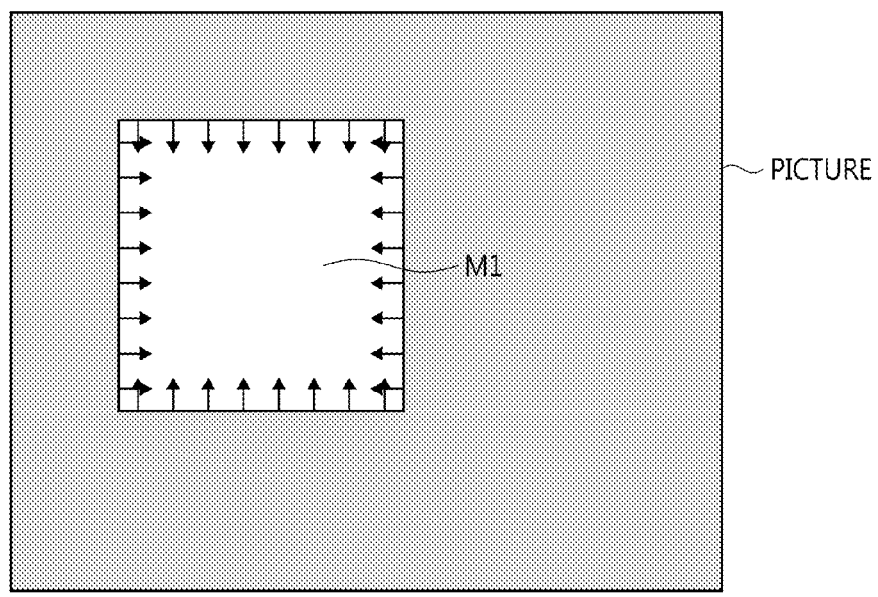

FIGS. 23A and 23B are conceptual diagrams illustrating partial in-loop filtering according to an exemplary embodiment.

FIG. 23A is a conceptual diagram illustrating in-loop filtering performed between adjacent blocks. A macro-block M1 may perform in-loop filtering by referring to pixel values of the adjacent blocks on the block boundaries as illustrated by the double-headed arrows in FIG. 23A.

FIG. 23B is a conceptual diagram illustrating partial in-loop filtering performed for a reconstructed block by modifying first motion compensation information of the reconstructed block. Referring to FIG. 23B, a method for an error compensation according to an exemplary embodiment may perform in-loop filtering for the current macro-block M1, but skip in-loop filtering for adjacent macro-blocks of the current macro block M1. The in-loop filtering for the current macro-block M1 may be performed only for pixels on the boundaries of the current macro-block M1. The restricted in-loop filtering described above may be called "partial in-loop filtering." The partial in-loop filtering may perform in-loop filtering for only a portion of the boundaries of the current macro-block M1.

For example, the data processing system 100A may prohibit the errors of pixel values of a current decoding block M1 from being spread over adjacent blocks on the boundaries of the current decoding block M1 by performing in-loop filtering for only internal pixels on the boundary of the current decoding block M1. The data processing system 100A may perform a de-blocking effect on the boundaries of the current decoding block M1 by performing partial in-loop filtering according to the present inventive concept.

An in-loop filter which can perform partial in-loop filtering may perform partial in-loop filtering described in FIG. 23B when a received first control signal is activated, and may perform normal in-loop filtering described in FIG. 23A when the received first control signal is deactivated.

Figure 24:
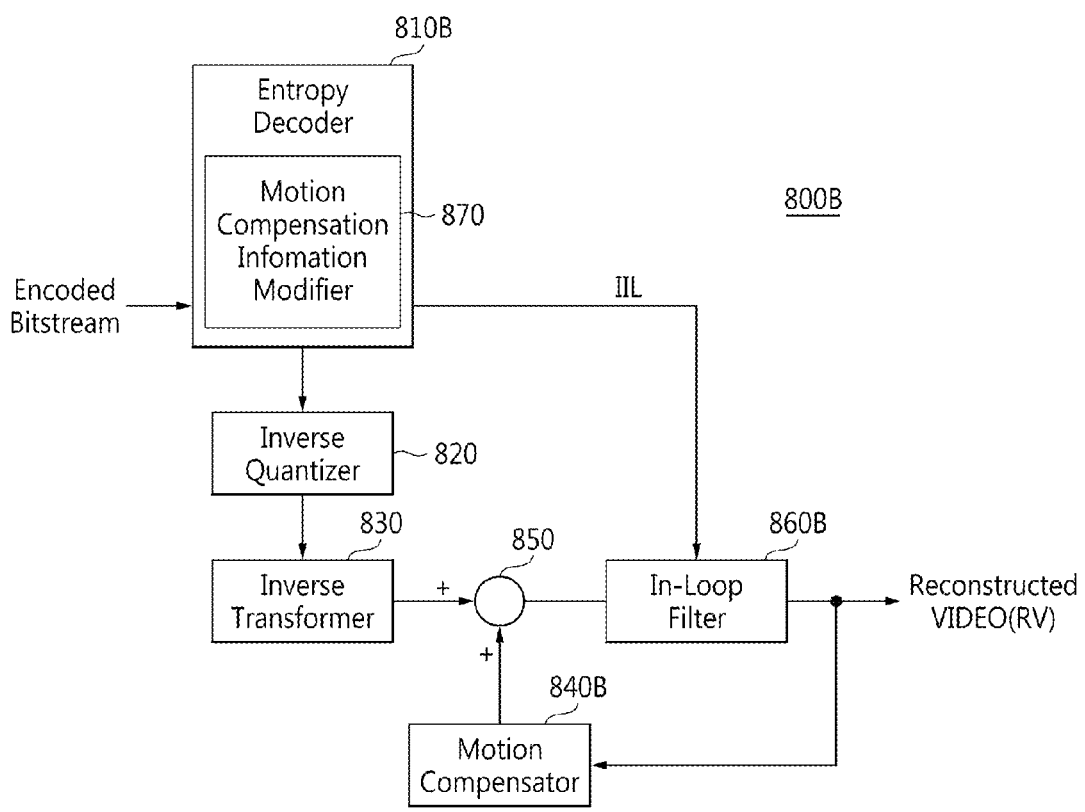
FIG. 24 is a block diagram illustrating a decoder according to an exemplary embodiment.

FIG. 24 is a block diagram illustrating a decoder according to an exemplary embodiment. Referring to FIG. 24, a decoder 800B may include an entropy decoder 810B, an inverse quantizer 820, an inverse transformer 830, a motion compensator 840B, an adder 850, and an in-loop filter 860B which performs partial in-loop filtering. The decoder 800B may be embodied in at least one of the hardware codecs 230-1 to 230-N illustrated in FIG. 1.

As described in FIGS. 18 to 23B, the decoder 800B may provide a first control signal IIL to the in-loop filter 860B when the decoder 800B modifies motion compensation information of a current decoding block. As discussed above, a state of the first control signal IIL may determine partial in-loop filtering or normal in-loop filtering.

The first control signal may be provided from the entropy decoder 810B as shown in FIG. 24, or from the motion compensator 840B. In such a case, the entropy decoder 810B or the motion compensator 840B may include a motion compensation information modifier 870. For example, when the decoder 800B receives an encoded bitstream, the entropy decoder 810B may extract first motion compensation information for a decoding macro-block from the received encoded bitstream. The first motion compensation information may include a reference picture and a reference coordinate of the decoding macro-block or sub-blocks of the decoding macro-block.

The entropy decoder 810B may generate decoding history information which indicates whether decoding operation of a picture, a slice or a tile included in the encoded bitstream is finished or not. The decoding history information may be stored in a buffer or a cache memory in the entropy decoder 810B or the decoder 800B. The decoding history information may include digital bits each of which corresponds to a decoding result of the picture, the slice or the tile by the entropy decoder 810B or the decoder 800B.

The entropy decoder 810B may determine whether the first motion compensation information should be modified for increasing parallel processing performance based on the first motion compensation information and the decoding history information, and may provide a first control signal IIL to the in-loop filter 860B when the first motion compensation information is modified according to the determination result.

The modified motion compensation information and the first control signal IIL may be provided by the motion compensator 840B instead of the entropy decoder 810B. Hereinafter, for convenience in explanation, the duplicate explanation of the same structure and operations as those according to the above-described exemplary embodiments will be omitted, and explanation will be made of different points between the exemplary embodiments.

The decoding history information may be stored in the memories MEM1 to MEMn in FIG. 1 and be shared by the hardware codecs 230-1 to 230-N, or may be stored in a memory of the data processing system 100A.

Figure 25:
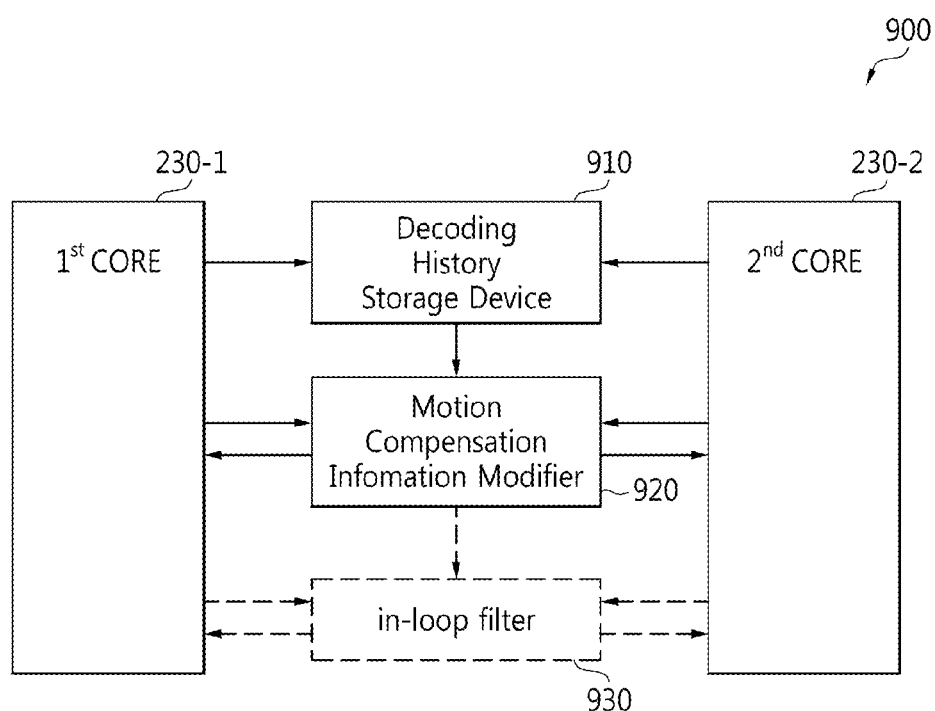
FIG. 25 is a block diagram illustrating a data processing system according to an exemplary embodiment.

FIG. 25 is a block diagram illustrating a data processing system according to an exemplary embodiment. Referring to FIG. 25, a data processing system 900 may include a first core 230-1, a second core 230-2, a decoding history storage device 910 and a motion compensation information modifier 920.

The decoding history storage device 910 and the motion compensation information modifier 920 may be shared by each of the first and second cores 230-1 and 230-2, while the decoder 800B in FIG. 24 includes the decoding history storage and the motion compensation information modifier 870 provided independently.

The decoding history storage device 910 may store decoding history information indicating whether decoding of a picture, a slice and/or a tile decoded by each of the first and second cores 230-1 and 230-2 is finished or not.

The motion compensation information modifier 920 may receive motion compensation information of a current decoding macro-block from each of the first and second cores 230-1 and 230-2, and may provide a first control signal IIL for partial in-loop filtering and modified motion compensation information to each of the first and second cores 230-1 and 230-2 based on the received motion compensation information and the decoding history information stored in the decoding history storage device 910.

Although FIG. 25 illustrates two cores 230-1 and 230-2, the decoding history storage device 910 and the motion compensation information modifier 920 may be shared by more than two cores.

In some exemplary embodiments, the data processing system 900 may further include an in-loop filter 930 which is shared by the first and second cores 230-1 and 230-2. When the first and second cores 230-1 and 230-2 transmit data of a decoded macro-block for in-loop filtering to the in-loop filter 930, the in-loop filter 930 may transmit data of the macro-block filtered by the in-loop filter 930 to the first and second cores 230-1 and 230-2.

Here, the in-loop filter 930 may perform partial in-loop filtering of a current decoding block in response to the first control signal IIL received from the motion compensation information modifier 920. When the first control signal IIL is activated, the in-loop filter 930 may perform the partial in-loop filtering of the current decoding block and transmit data corresponding to the macro-block filtered by the partial in-loop filtering to the first and second cores 230-1 and 230-2. When the first control signal IIL is deactivated, the in-loop filter 930 may perform normal in-loop filtering.

Figure 26:
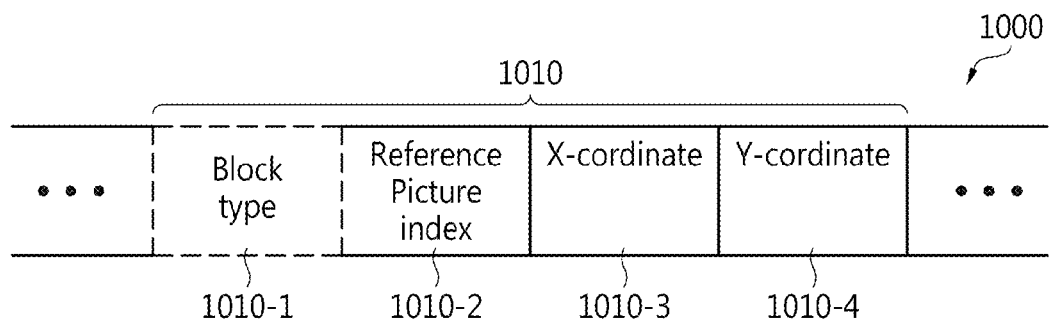
FIG. 26 is a data format illustrating an encoded bitstream including compensation information according to an exemplary embodiment.

FIG. 26 is a data format illustrating an encoded bitstream including compensation information according to exemplary embodiments. Referring to FIG. 26, a portion of an encoded bitstream 1000 may be assigned to motion compensation information 1010 including a block type 1010-1, a reference picture index 1010-2 and a reference X-coordinate 1010-3 and a reference Y-coordinate 1010-4. In some exemplary embodiments, the block type 1010-1 may be omitted.

As described in FIGS. 20 to 22, when a decoding block refers to more than one picture bi-directionally, the motion compensation information 1010 may include the block type 1010-1 that indicates a type of the macro-block, a reference picture index 1010-2 according to the block type 1010-1, and a reference coordinate including an X-coordinate 1010-3 and a Y-coordinate 1010-4, but the motion compensation information 1010 is not limited thereto. Alternatively, when the decoding block does not refer to more than one picture bi-directionally, the motion compensation information 1010 may omit the block type 1010-1.

A syntax related to the reference picture and the reference coordinate may vary according to a related video standard specification. For example, the syntax related to the motion compensation information according to H.264 standard may include a reference picture ID ref_idx_1x indicating a reference picture of the current decoding block and a differential motion vector mvd_1x indicating a coordinate difference between the current decoding block and a reference block of the current decoding block.

In addition, the syntax may include a macro-block type mb_type indicating an unidirectional reference or a bidirectional reference. The reference picture ID ref_idx_1x or the differential motion vector mvd_1x in reference to FIGS. 18 to 22 may be modified and the macro-block type mb_type may be modified in reference to FIGS. 20 and 22. The macro-block type mb_type may correspond to the block type 1010-1 in FIG. 26, and the reference picture ID ref_idx_1x may correspond to the reference picture index 1010-2 in FIG. 26. The differential motion vector mvd_1x may correspond to the X-coordinate 1010-3 and the Y-coordinate 1010-4 in FIG. 26.

Figure 27:
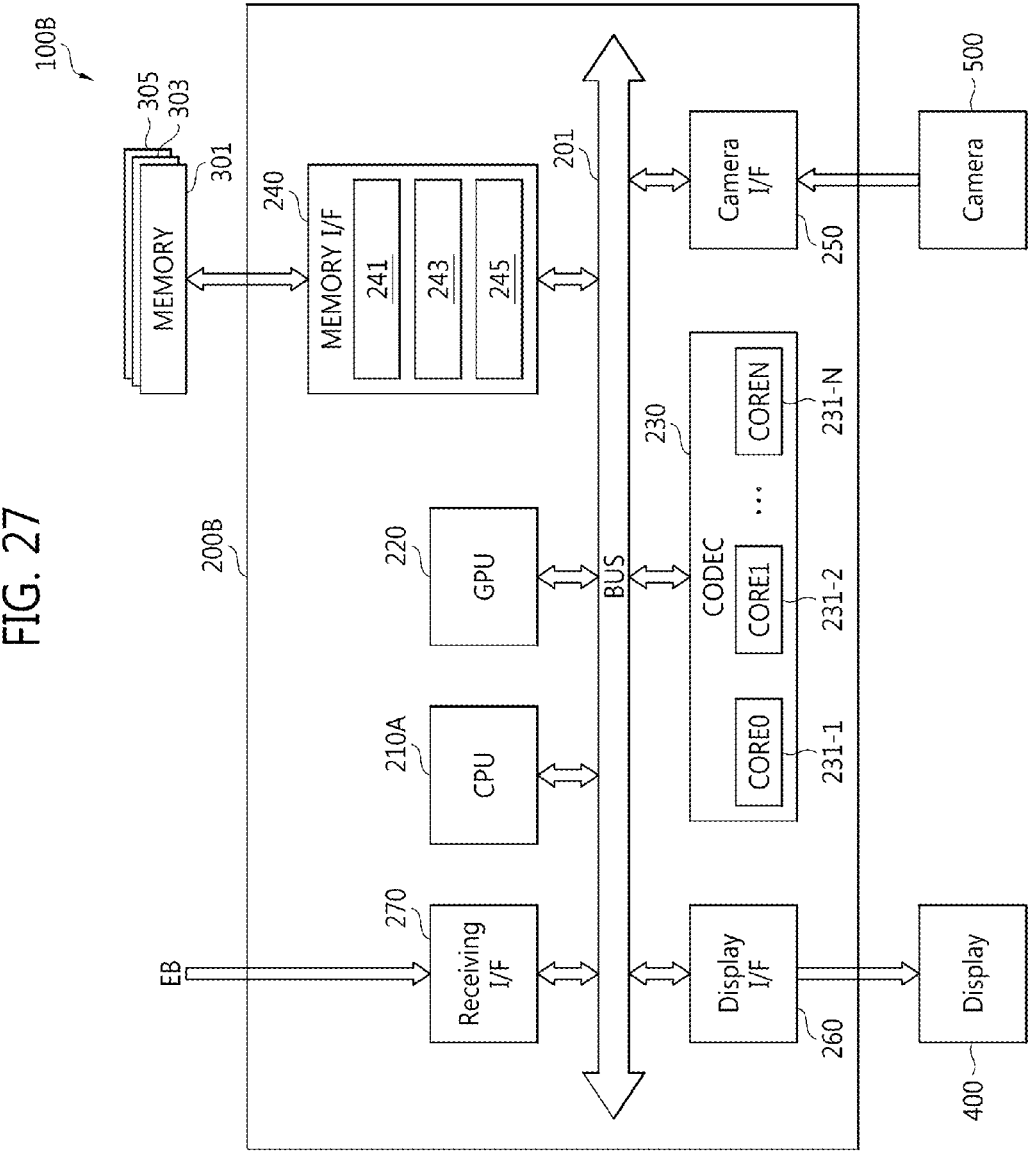
FIG. 27 is a block diagram illustrating a data processing system according to an exemplary embodiment.

FIG. 27 is a block diagram illustrating a data processing system according to an exemplary embodiment.

Referring to FIG. 27, a data processing system 100B may include a controller 200B, a plurality of memories 301, 303, 305, and a display 400. In some exemplary embodiments, the data processing system 100B may further include a camera 500.

The controller 200B may be embodied in an integrated circuit (IC), a system-on-chip (SoC), an application processor (AP), and/or a mobile AP, etc.

The controller 200B may include a CPU 210A, a GPU 220, a plurality of hardware codec 230, a memory interface (I/F) 240, a display interface (I/F) 260 and a receiver interface (I/F) 270. When the data processing system 100B further includes a camera 500, the controller 200B may further include a camera interface (I/F) 250.

The controller 200B shown in FIG. 27 is equal to or similar to the controller 200A shown in FIG. 1 in view of structure and operation except for the plurality of codecs 231-1 to 231-N included in a hardware codec.

Operations of each of the plurality of codecs 231-1 to 231-N may be equal to or similar to the operations of each of the plurality of hardware codecs 230-1 to 230-N in FIG. 1. In addition, each of the plurality of codecs 231-1 to 231-N may have a memory corresponding to each of the memories MEM1 to MEMN.

Each of the plurality of codecs 231-1 to 231-N may include the components 701, 700 and 800 that are described with reference to FIGS. 15 to 17. The first core CORE0, the second CORE1 and the third core CORE2 described in FIG. 4 to FIG. 14 may correspond to a first core 231-1, a second core 231-2, and a third core 231-3, respectively.

Figure 28:
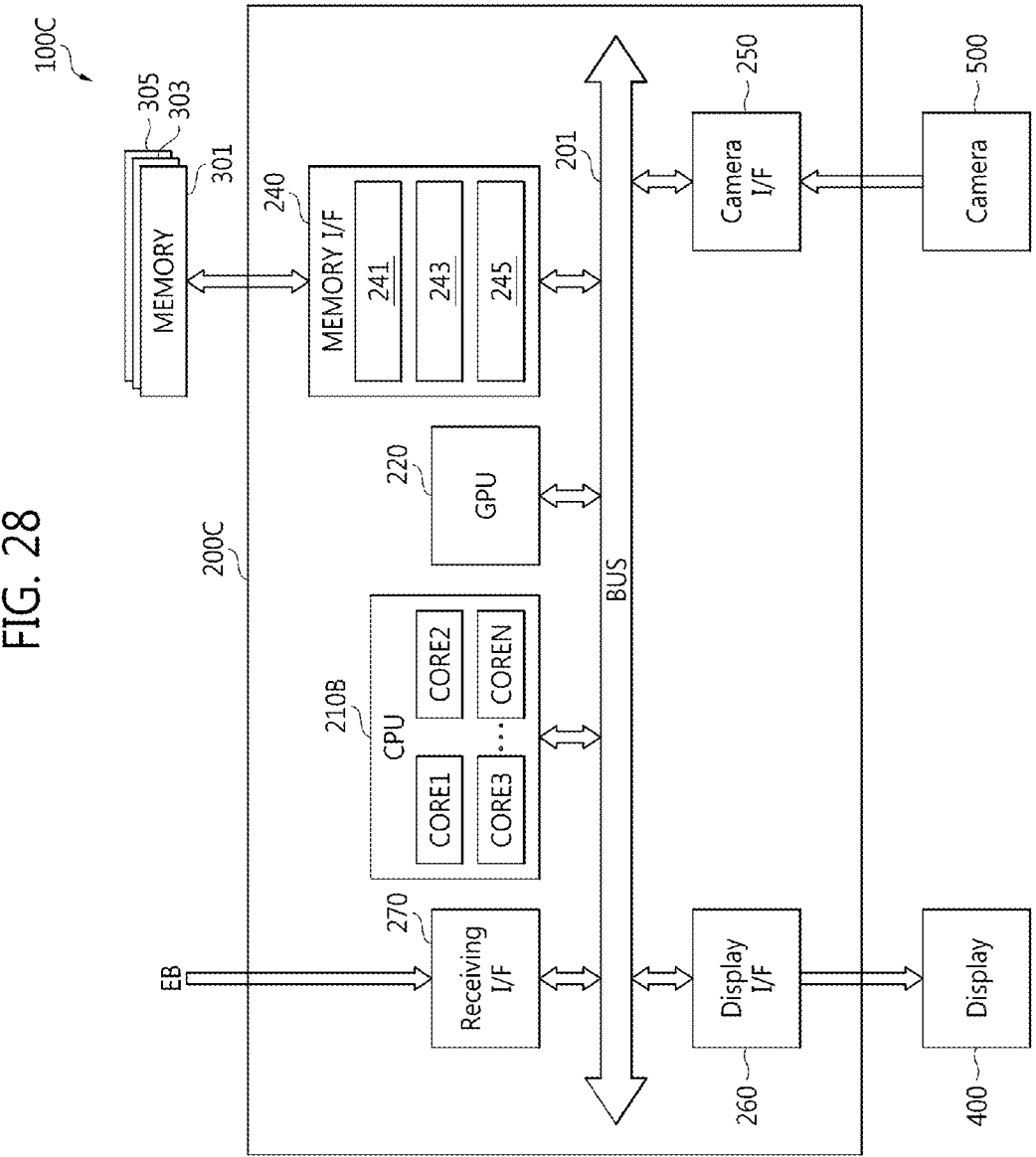
FIG. 28 is a block diagram illustrating a data processing system according to an exemplary embodiment.

FIG. 28 is a block diagram illustrating a data processing system according to an exemplary embodiment.

Referring to FIG. 28, a data processing system 100C may include a controller 200C, a plurality of memories 301, 303, 305, and a display 400. In some exemplary embodiments, the data processing system 100C may further include a camera 500.

The controller 200C may be embodied in an integrated circuit (IC), a system-on-chip (SoC), an application processor (AP), and/or a mobile AP, etc.

The controller 200C may include a CPU 210B, a GPU 220, a plurality of hardware codec 230, a memory interface (I/F) 240, a display interface (I/F) 260 and a receiver interface (I/F) 270. When the data processing system 100C further includes a camera 500, the controller 200C may further include a camera interface (I/F) 250.

The controller 200C shown in FIG. 27 is equal to or similar to the controller 200A shown in FIG. 1 in view of structure and operation except that the CPU 210B includes a plurality of cores CORE1 to COREN.

Operations of each of the plurality of cores CORE1 to COREN may be equal to or similar to the operations of each of the plurality of hardware codecs 230-1 to 230-N in FIG. 1. In addition, each of the plurality of codecs 231-1 to 231-N may have a memory (e.g., a cache) corresponding to each of the memories MEM1 to MEMN.

Each of the plurality of cores CORE1 to COREN may execute a software codec. The first core CORE0, the second CORE1 and the third core CORE2 described in FIG. 4 to FIG. 14 may correspond to a first core CORE1, a second core CORE2, and a third core CORE2 in FIG. 28, respectively when N is 3.

The software codec executed by each of the cores CORE1 to COREN may perform encoding, decoding, encoding including in-loop filtering, or decoding including in-loop filtering with reference to FIGS. 4 to 14.

Figure 29:
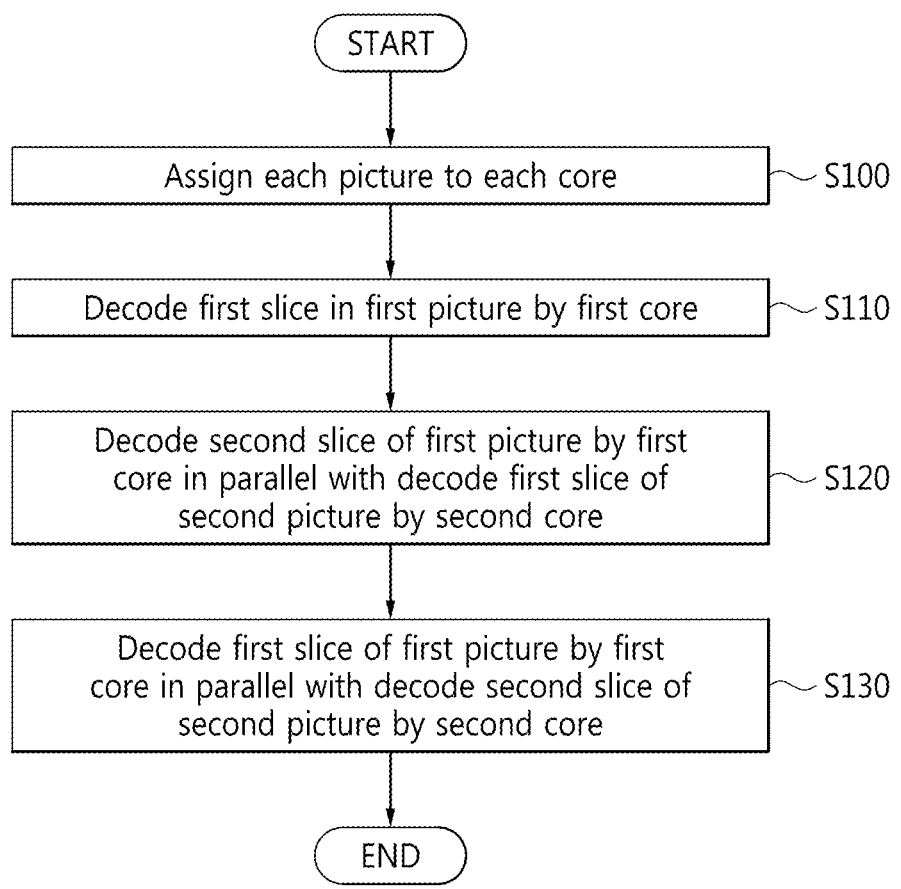
FIG. 29 is a flow chart illustrating a method of processing video data by the data processing system shown in FIGS. 1, 18, and 19, according to an exemplary embodiment.

FIG. 29 is a flow chart illustrating a method for processing video data by the data processing system shown in FIGS. 1, 18, and 19, according to an exemplary embodiment. The method of processing may be, for example, encoding or decoding.

Referring to FIGS. 1 to 20, in operation S100, each picture is assigned to a core. For example, each of a first picture, a second picture and a third picture in video data may be assigned one of a first core and a second core for processing the video data. Each of the first picture, the second picture and the third picture may include a first slice (or a first tile) and a second slice (or a second tile) respectively.

In operation S110, a first slice (or a first tile) in the first picture may be processed by the first core. In operation S120, a first slice (or a first tile) in the second picture may be processed by the second core in parallel while a second slice (or a second tile) of the first picture is processed by the first core. In operation S120, the first core may further perform in-loop filtering of the first slice and the second slice of the first picture based on the processing result of the first slice of the first picture. In operation S130, a first slice (or a first tile) in the third picture may be processed by the third core in parallel while a second slice (or a second tile) of the second picture is processed by the second core. In operation S130, the second core may further perform in-loop filtering of the first slice and the second slice of the second picture based on the processing result of the first slice of the second picture.

As described above, the method for decoding video data described in FIGS. 1 to 14, and 18 to 20, may be used similarly for a method for encoding the video data by assigning each of a plurality of pictures to each of a plurality of cores and processing in parallel the plurality of pictures by the plurality of cores.

Figure 30:
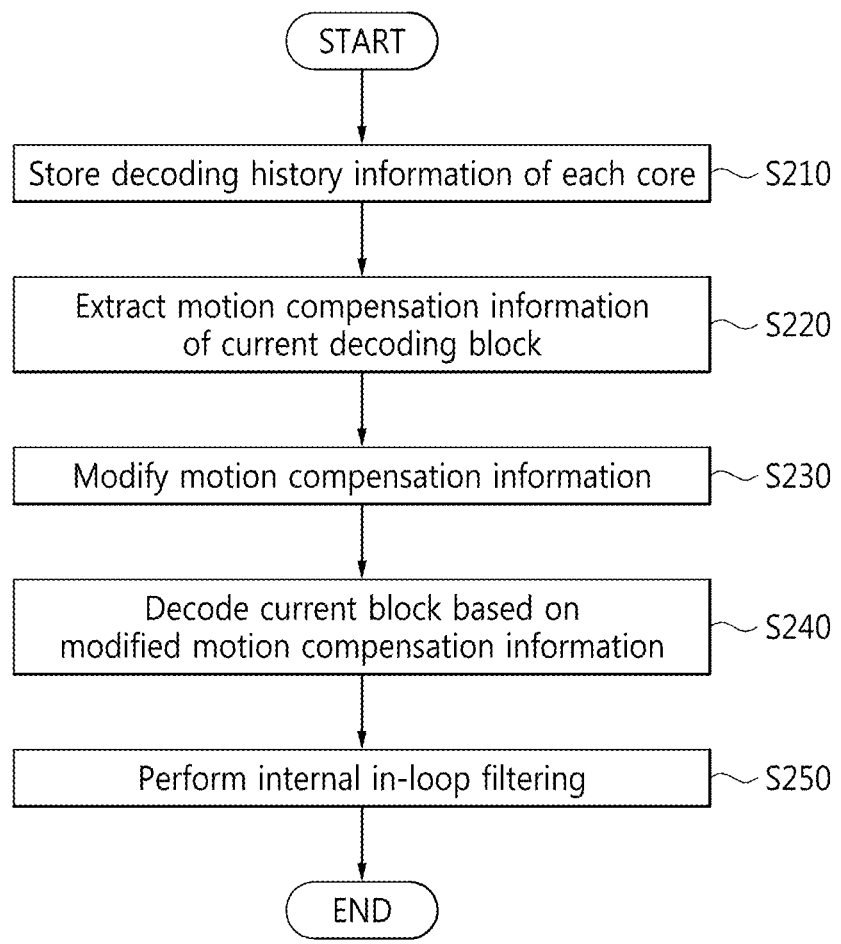
FIG. 30 is a flow chart illustrating a method for processing video data, according to another exemplary embodiment.

FIG. 30 is a flow chart illustrating a method for processing video data, according to another exemplary embodiment. In operation S210, decoding history information of each core may be stored. In operation S220, motion compensation information of a current decoding block may be extracted. In operation S230, the motion compensation information may be modified. In operation S240, the current block may be decoded based on the modified motion compensation information. In operation S250, internal in-loop filtering may be performed.

Although the present inventive concept has been described with reference to certain exemplary embodiments thereof, it will be understood by those of ordinary skill in the art that various changes in forms and details may be made thereto without departing from the spirit and scope of the present inventive concept as defined by the following claims.

What is claimed is:

1. A data processing system comprising:
   a first hardware core that decodes a first picture and generates first picture decoding history information of the first picture that has been decoded; and a second hardware core that modifies first motion compensation information included in a second picture based on the first picture decoding history information, and decodes the second picture based on the first picture that has been decoded and the first motion compensation information that has been modified.

2. The data processing system of claim 1, wherein the second hardware core generates second picture decoding history information of the second picture that has been decoded, and
the first hardware core modifies second motion compensation information included in a third picture based on the second picture decoding history information, and decodes the third picture based on the second motion compensation information that has been modified and one of the first picture and the second picture that have been decoded.

3. The data processing system of claim 2, wherein the first hardware core comprises a first motion compensation information modifier that modifies the second motion compensation information, and the second hardware core comprises a second motion compensation information modifier that modifies the first motion compensation information.

4. The data processing system of claim 3, wherein the first hardware core comprises a first in-loop filter connected to the first motion compensation information modifier, and the second hardware core comprises a second in-loop filter connected to the second motion compensation information modifier.

5. The data processing system of claim 4, wherein the first in-loop filter performs partial in-loop filtering that is a de-blocking operation only in a block related to the first motion compensation information that has been modified, based on a first control signal received from the first motion compensation information modifier, and the second in-loop filter performs partial in-loop filtering that is a de-blocking operation only in a block related to the second motion compensation information that has been modified, based on a second control signal received from the second motion compensation information modifier.

6. The data processing system of claim 2, wherein the first picture includes a first divided region, the first picture decoding history information includes first divided region decoding history information of the first divided region, and the second hardware core modifies the first motion compensation information based on the first divided region decoding history information.

7. The data processing system of claim 6, wherein the first motion compensation information that has been modified includes a modified reference coordinate corresponding to a reference coordinate included in the first motion compensation information.

8. The data processing system of claim 6, wherein the second picture includes a second divided region, the second picture decoding history information includes second divided region decoding history information of the second divided region, and the first hardware core modifies the second motion compensation information based on the second divided region decoding history information.

9. The data processing system of claim 8, wherein the second motion compensation information that has been modified includes a modified reference picture index that is modified with respect to a reference picture index included in the second motion compensation information.

10. A method for decoding a plurality of pictures in video data, the method comprising:
receiving a first picture having a first divided region;
receiving a second picture having a second divided region;
extracting first motion compensation information included in the second picture;
modifying the first motion compensation information; and
decoding the second picture based on the first divided region and the first motion compensation information that has been modified.

11. The method of claim 10, wherein the modifying the first motion compensation information comprises modifying a reference coordinate of a reference picture included in the first motion compensation information based on reference picture decoding history information of the reference picture related to the first motion compensation information that has been extracted.

12. The method of claim 11, wherein the first picture includes a third divided region different from the first divided region, and
the modifying the reference coordinate of the reference picture comprises changing the reference coordinate from a first coordinate that refers to the first divided region to a second coordinate that refers to the third divided region.

13. The method of claim 12, further comprising:
decoding a block included in the second divided region based on the first motion compensation information that has been modified and the first picture; and
performing partial in-loop filtering of the block that has been decoded.

14. The method of claim 10, further comprising:
receiving a third picture having a third divided region;
extracting second motion compensation information included in the third picture;
modifying the second motion compensation information; and
decoding the third picture based on the second motion compensation information that has been modified.

15. The method of claim 14, wherein the modifying the second motion compensation information comprises modifying a reference picture index included in the second motion compensation information based on reference picture decoding history information of a reference picture referred to by the reference picture index.

16. The method of claim 15, wherein the modifying the reference picture index comprises changing the reference picture index from a second index referring to the second picture to a first index referring to the first picture.

17. The method of claim 16, further comprising:
decoding a block in the third divided region based on the second motion compensation information that has been modified and the second picture; and
performing partial in-loop filtering of the block that has been decoded.

18. The method of claim 10, wherein the first motion compensation information that has been extracted is modified based on a number of reference pictures included in the first motion compensation information that has been extracted.

19. The method of claim 10, wherein the first motion compensation information that has been extracted is modified based on a value of a motion vector included in the first motion compensation information that has been extracted.

20. The method of claim 10, wherein the first motion compensation information that has been extracted is modified, before a de-blocking operation, based on difference in pixel values on a boundary between adjacent blocks that have been decoded.

\* \* \* \* \*